United States Patent
Imoto

[19]

[11] Patent Number: 5,995,181
[45] Date of Patent: Nov. 30, 1999

[54] ANTIFERROELECTRIC LIQUID CRYSTAL WITH POLARIZING AXES ORIENTED BETWEEN A MOLECULAR AXIS DIRECTION IN RIGHTWARD-TILTED ANTIFERROELECTRIC STATE AND A MOLECULAR AXIS DIRECTION IN LEFTWARD-TILTED ANTIFERROELECTRIC STATE

[75] Inventor: Satoshi Imoto, Tanashi, Japan

[73] Assignee: Citizen Watch Co., Ltd., Tokyo, Japan

[21] Appl. No.: 09/194,361

[22] PCT Filed: Mar. 31, 1998

[86] PCT No.: PCT/JP98/01461

§ 371 Date: Nov. 25, 1998

§ 102(e) Date: Nov. 25, 1998

[87] PCT Pub. No.: WO98/44383

PCT Pub. Date: Oct. 8, 1998

[30] Foreign Application Priority Data

Mar. 31, 1997 [JP] Japan .................................... 9-079838
Mar. 31, 1997 [JP] Japan .................................... 9-079839

[51] Int. Cl.$^6$ .......................... G02F 1/1335; G02F 1/13; G02F 1/141; C09K 3/36
[52] U.S. Cl. .......................... 349/100; 349/187; 349/37; 349/174; 345/97
[58] Field of Search .......................... 349/100, 99, 187, 349/85, 37, 171, 174; 345/97

[56] References Cited

U.S. PATENT DOCUMENTS

| 4,898,456 | 2/1990 | Okada et al. .............................. 345/97 |
| 5,013,137 | 5/1991 | Tsuboyama et al. ..................... 345/97 |
| 5,214,523 | 5/1993 | Nito et al. ................................. 359/100 |
| 5,367,391 | 11/1994 | Johno et al. ................................ 349/37 |
| 5,459,481 | 10/1995 | Tanaka et al. ............................. 345/95 |
| 5,781,267 | 7/1998 | Takimoto et al. ....................... 349/174 |
| 5,784,140 | 7/1998 | Lee ......................................... 349/174 |
| 5,847,790 | 12/1998 | Andersson et al. .................... 349/100 |
| 5,847,799 | 12/1998 | Tanaka et al. .......................... 349/174 |

FOREIGN PATENT DOCUMENTS

| 5-19261 | 1/1993 | Japan . |
| 6-214261 | 8/1994 | Japan . |
| 8-328046 | 12/1996 | Japan . |

*Primary Examiner*—William L. Sikes
*Assistant Examiner*—Kari M. Hoirey
*Attorney, Agent, or Firm*—Finnegan, Henderson, Farabow, Garrett & Dunner, L.L.P.

[57] ABSTRACT

An antiferroelectric liquid crystal display apparatus with a high display quality is provided wherein the display screen in the absence of an applied voltage is free from unevenness when power is turned off. An intrinsic antiferroelectric axis direction is set at the midpoint between the average molecular axis direction when the liquid crystal panel is in a rightward-tilted antiferroelectric state and that when it is in a leftward-tilted antiferroelectric state, and the polarization axis of a polarizer is oriented in the same direction as the intrinsic antiferroeelctric axis direction. The rightward-tilted antiferroelectric state refers to a displacement from the average molecular axis direction in the antiferroelectric state, after returning from the rightward-tilted ferroelectric state, while the leftward-tilted antiferroelectric state refers to a displacement from the average molecular axis direction in the antiferroelectric state, after returning from the leftward-tilted ferroelectric state. This configuration reduces the brightness difference between the rightward-tilted antiferroelectric state and the leftward-tilted antiferroelectric state.

24 Claims, 14 Drawing Sheets

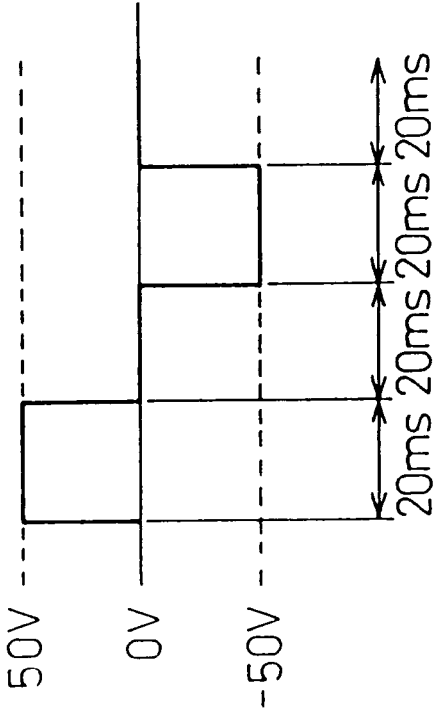
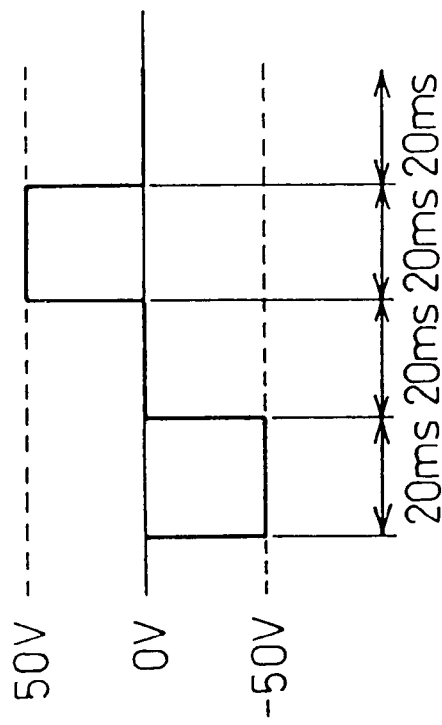
Fig. 8

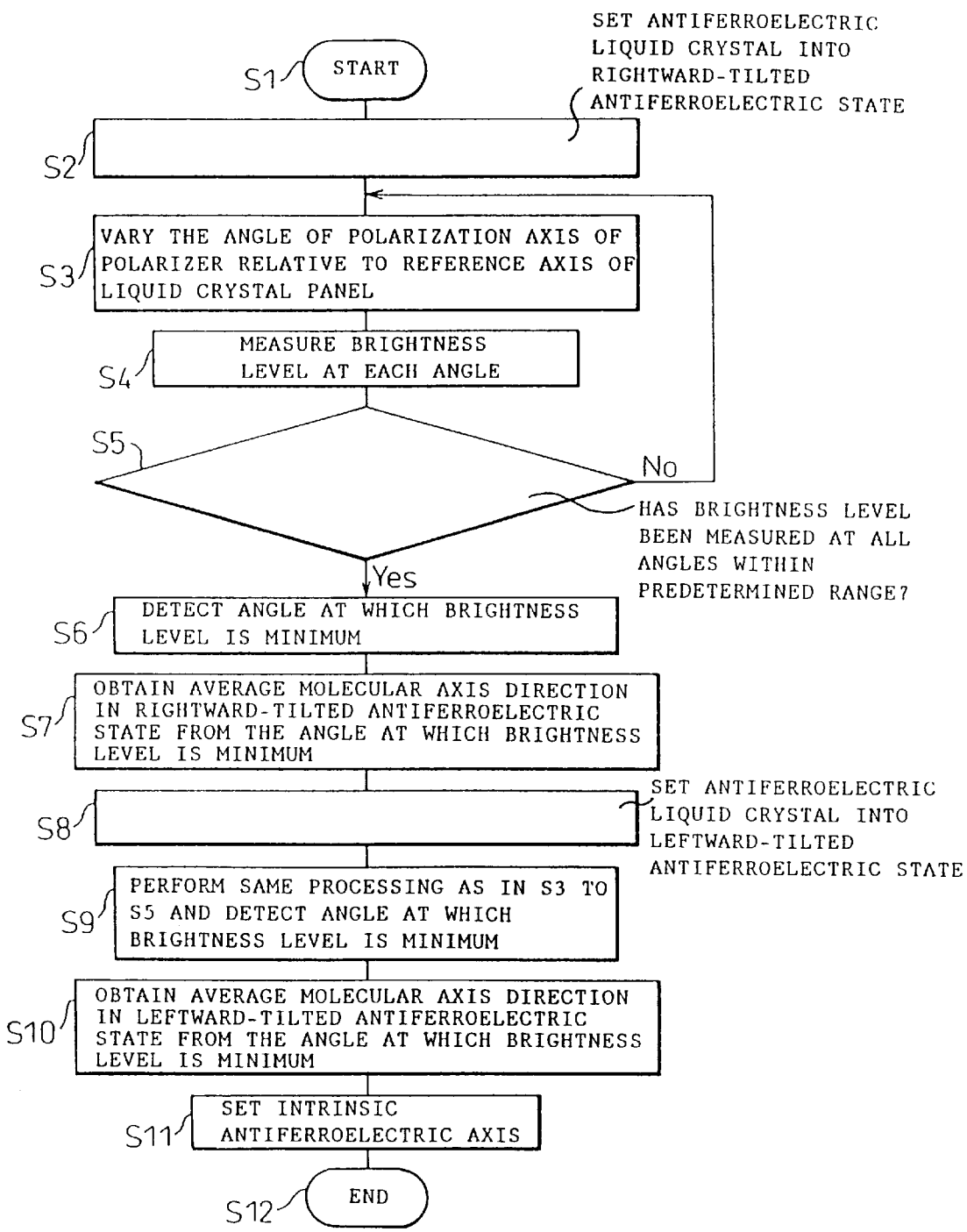

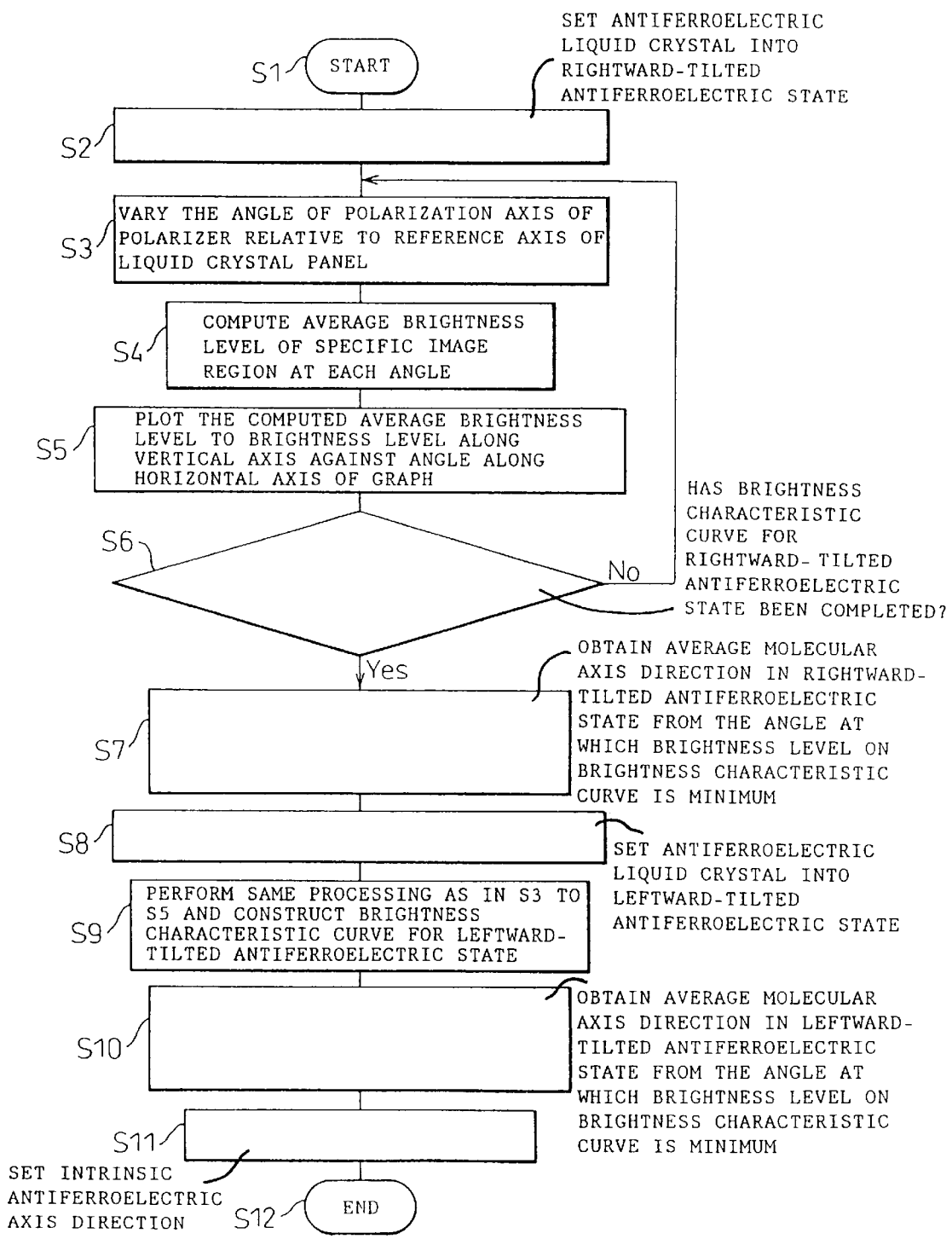

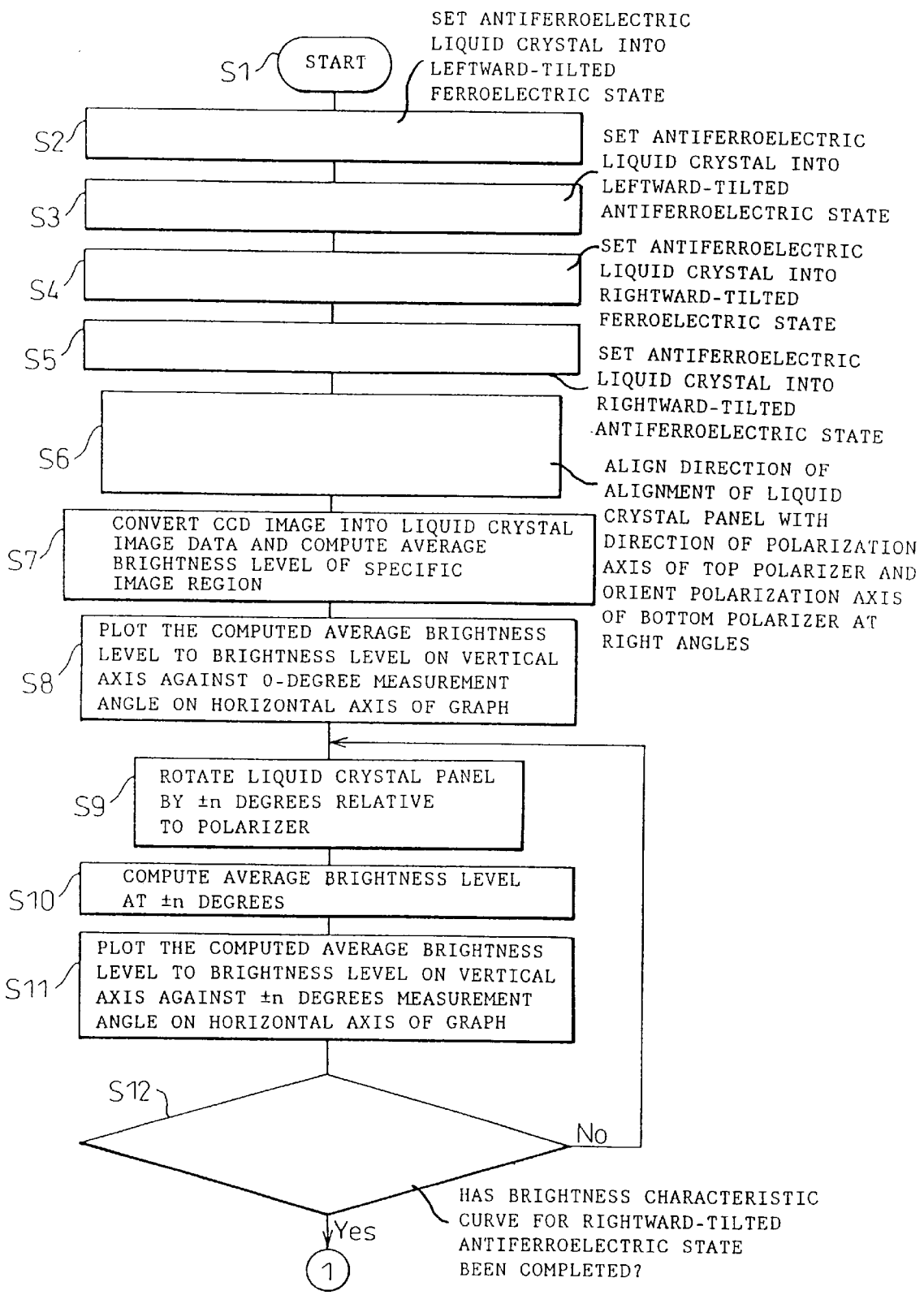

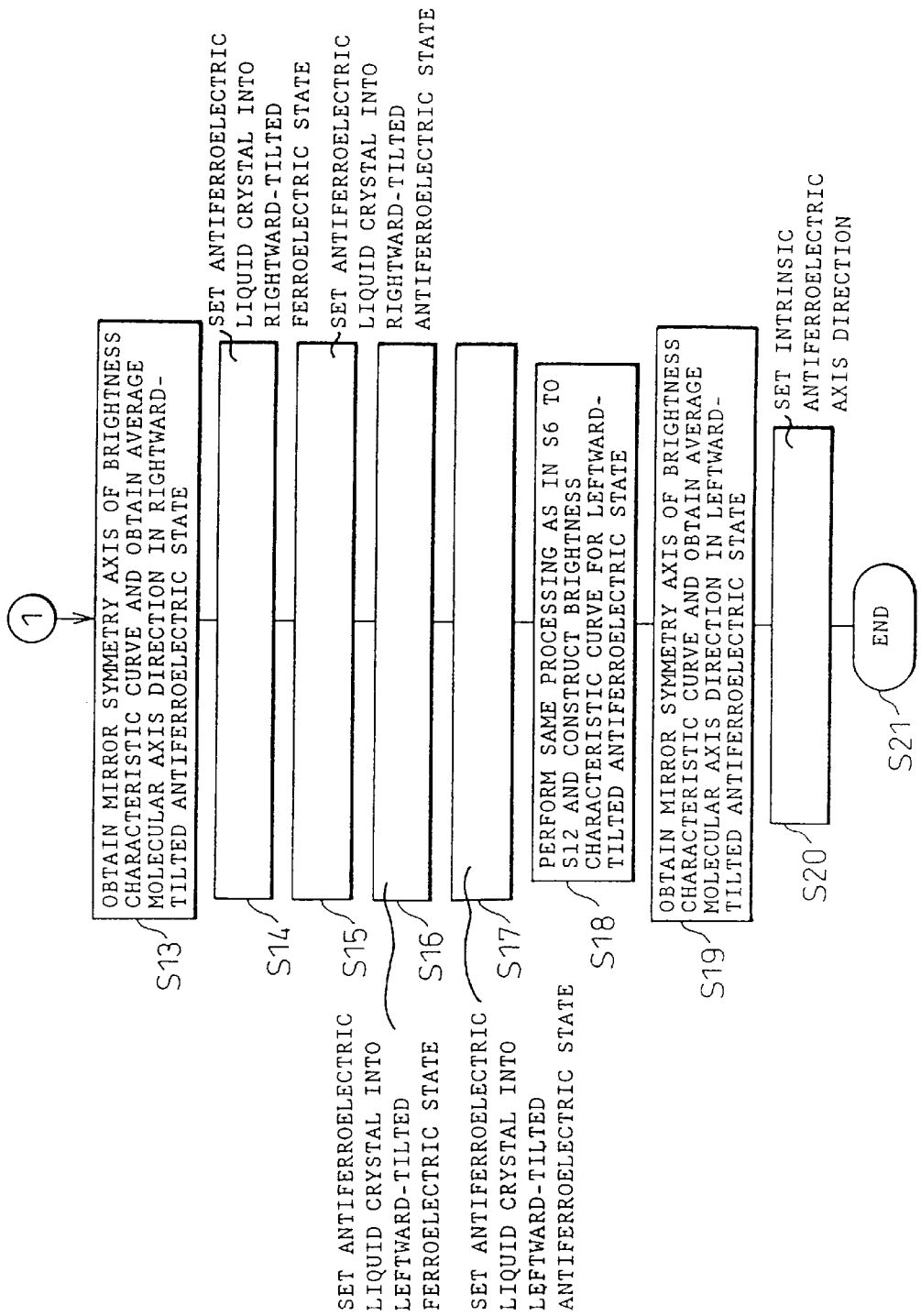

ANTIFERROELECTRIC LIQUID CRYSTAL WITH POLARIZING AXES ORIENTED BETWEEN A MOLECULAR AXIS DIRECTION IN RIGHTWARD-TILTED ANTIFERROELECTRIC STATE AND A MOLECULAR AXIS DIRECTION IN LEFTWARD-TILTED ANTIFERROELECTRIC STATE

TECHNICAL FIELD

The present invention relates to a liquid crystal display apparatus using an antiferroelectric liquid crystal display panel which has a plurality of column electrodes and row electrodes, and a method for fabricating the same.

BACKGROUND ART

When ferroelectric liquid crystals are in a surface stabilized state, smectic layers align perpendicular to transparent substrates arranged on the top and the bottom. In this situation, each smectic layer is stable in either one of states, i.e., the state in which spontaneous polarization Ps points upward and the molecular axis is tilted to the right or the state in which the spontaneous polarization Ps points downward and the molecular axis is tilted to the left, and the two stable states exist simultaneously. An alignment film is formed on each of the top and bottom transparent substrates and a treatment for a direction of alignment is made to control the orientation of the smectic layers, and a liquid crystal panel with the direction of alignment oriented in the direction of the smectic layers of the ferroelectric liquid crystal is thus constructed. When an upward-directed electric field is applied across the ferroelectric liquid crystal panel, the liquid crystal is set into a rightward-tilted ferroelectric state with the molecules as a whole tilted rightward by an angle θ relative to the direction of alignment, and the molecular axis is also tilted rightward by θ. When the applied electric field is reversed to point downward, the liquid crystal is then set into a leftward-tilted ferroelectric state with the molecules as a whole tilted leftward by θ relative to the direction of alignment, and the molecular axis is also tilted leftward by θ.

Antiferroelectric liquid crystals also possess spontaneous polarization in a surface stabilized state, and the smectic layers are oriented perpendicular to the top and bottom transparent substrates. However, unlike ferroelectric liquid crystals, the direction of the spontaneous polarization is changed every one or every few layers, mutually canceling the spontaneous polarization and thus obtaining a stable antiferroelectric state. In the antiferroelectric state, when the state in which the direction of the spontaneous polarization is tilted rightward exists alternately with the state in which the direction of the spontaneous polarization is tilted leftward, for example, the molecular axis direction in the antiferroelectric state is represented by the molecular axis direction (hereinafter described as the "average molecular axis direction") obtained by averaging the rightward and leftward tilting molecular axis directions, and this average molecular axis direction substantially coincides with the direction of alignment. When an upward-directed electric field is applied across a liquid crystal in such an antiferroelectric state, the rightward-tilted ferroelectric state results with the molecules as a whole tilted rightward by θ. When the electric field is applied in the downward direction by reversing the polarity of the applied voltage, the result is the leftward-tilted ferroelectric state with the molecules as a whole tilted leftward by θ. The polarization axis of one of the polarizers is aligned to coincide with the average molecular axis direction in the antiferroelectric state, and the polarization axis of the other polarizer is oriented at right angles to the polarization axis of the first polarizer. In the antiferroelectric state, since the polarization axis direction coincides with the average molecular axis direction, light is not transmitted; this state is the dark state. On the other hand, in both the rightward-tilted and leftward-tilted ferroelectric states, light is transmitted because of a displacement between the polarization axis direction and the average molecular axis direction; this state is the bright state.

SUMMARY OF THE INVENTION

In a liquid crystal display apparatus using an antiferroelectric liquid crystal, when power is turned off while the entire screen is in the bright state, the screen is split into upper and lower halves with different brightness levels (hereinafter called the "screen differential phenomenon"). Though the screen differential phenomenon does not occur in every liquid crystal panel, if it does occur, the screen differential phenomenon is always visually observable on the liquid crystal panel. However, there is no reproducibility about the location of the upper/lower screen boundary, and also, in some cases, the upper screen is brighter than the lower screen, and in other cases, the lower screen is brighter than the upper screen. With display patterns other than the entire screen bright state, a similar phenomenon has been observed to occur, the phenomenon differing depending on the display pattern. This has lead to the problem that the display screen of the liquid crystal panel, in the absence of an applied voltage, is not uniform, degrading the display quality.

It has also been observed that when power is turned on to the liquid crystal panel that exhibited a screen differential phenomenon when power was turned off, the same screen differential phenomenon that occurred at power off appears in the black display portion of the screen.

It is, accordingly, an object of the present invention to provide an antiferroelectric liquid crystal display apparatus in which the screen differential phenomenon does not occur when power is turned off or when power is turned on again.

To achieve the above object, in one antiferroelectric liquid crystal display apparatus of the present invention, an intrinsic antiferroelectric axis direction is provided between the average molecular axis direction of the antiferroelectric liquid crystal panel in a rightward-tilted antiferroelectric state and the average molecular axis direction in a leftward-tilted antiferroelectric state, and at least one polarizer is disposed so that the direction of its polarization axis is aligned to be oriented in the same direction as the intrinsic antiferroelectric axis direction.

Further, in another antiferroelectric liquid crystal display apparatus of the present invention, the intrinsic antiferroelectric axis direction is provided between the average molecular axis direction of the antiferroelectric liquid crystal panel in the rightward-tilted antiferroelectric state and the average molecular axis direction in the leftward-tilted antiferroelectric state, and polarizers are arranged in such a manner that the polarization axis of one polarizer is aligned to be oriented in the same direction as the intrinsic antiferroelectric axis direction, and that the polarization axis of the other polarizer is oriented at right angles to the polarization axis of the one polarizer.

It is a second object of the present invention to provide a method for fabricating an antiferroelectric liquid crystal display apparatus in which the screen differential phenomenon does not occur.

More specifically, the second object of the invention is to obtain the intrinsic antiferroelectric axis direction of the liquid crystal panel.

According to the present invention, the antiferroelectric liquid crystal in the liquid crystal panel is set into the rightward-tilted antiferroelectric state, the angle of the polarization axis of the polarizer relative to the reference axis of the liquid crystal panel is varied, brightness levels at respective angles within a predetermined range are measured by measuring the brightness level at each angle, the angle at which the brightness level is maximum or minimum is detected, and the average molecular axis direction in the rightward-tilted antiferroelectric state is obtained from the detected angle. In like manner, the average molecular axis direction in the leftward-tilted antiferroelectric state is obtained. Then, the intrinsic antiferroelectric axis direction is set between the average molecular axis direction in the rightward-tilted antiferroelectric state and the average molecular axis direction in the leftward-tilted antiferroelectric state.

Further, according to the present invention, the antiferroelectric liquid crystal in the liquid crystal panel is set into the rightward-tilted antiferroelectric state, the angle of the polarization axis of the polarizer relative to the reference axis of the liquid crystal panel is varied, the average brightness level of an attention image region is computed at each angle, a brightness characteristic curve for the rightward-tilted antiferroelectric state is constructed by plotting the computed average brightness level to the brightness level along a vertical axis against the angle along a horizontal axis of a graph, and the average molecular axis direction in the rightward-tilted antiferroelectric state is obtained from an angle at which the brightness level is maximum or minimum. In like manner, the average molecular axis direction in the leftward-tilted antiferroelectric state is obtained. Then, the intrinsic antiferroelectric axis direction is set between the average molecular axis direction in the rightward-tilted antiferroelectric state and the average molecular axis direction in the leftward-tilted antiferroelectric state.

EFFECT OF THE INVENTION

With the above means, if an antiferroelectric liquid crystal is used in which there occurs a displacement between the average molecular axis direction in the rightward-tilted antiferroelectric state and the average molecular axis direction in the leftward-tilted antiferroelectric state, a brightness difference between the rightward-tilted antiferroelectric state and the leftward-tilted antiferroelectric state can be reduced. As a result, an antiferroelectric liquid crystal display apparatus with good display quality capable of producing a uniform display screen can be provided.

Furthermore, a method for obtaining the intrinsic antiferroelectric axis direction can be provided that is necessary to reduce the brightness difference between the rightward-tilted antiferroelectric state and the leftward-tilted antiferroelectric state.

BRIEF DESCRIPTION OF THE DRAWINGS

FIG. 7 is a diagram showing a liquid crystal panel where a screen differential phenomenon occurred when power was turned on.

FIG. 8 is a diagram for explaining a rightward-tilted antiferroelectric state and a leftward-tilted antiferroelectric state.

FIG. 17 is a diagram showing a flowchart for obtaining the intrinsic antiferroelectric axis direction.

FIG. 18 is a diagram showing another flowchart for obtaining the intrinsic antiferroelectric axis direction.

FIG. 19 is a diagram showing still another flowchart for obtaining the intrinsic antiferroelectric axis direction.

FIG. 20 is a diagram showing the continuation of the flowchart shown in FIG. 19.

DETAILED DESCRIPTION OF THE INVENTION

Figure 1:
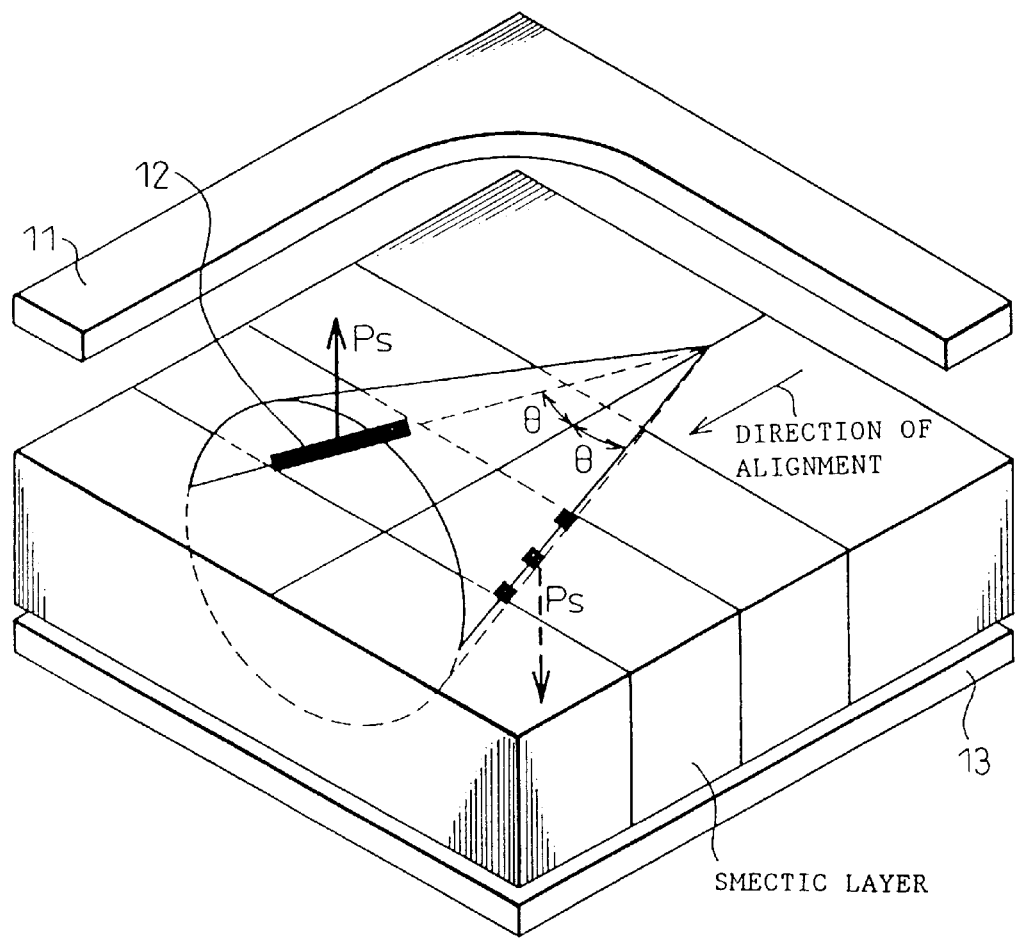
FIG. 1 is a diagram showing a surface stabilized state of a ferroelectric liquid crystal.
Figure 2:
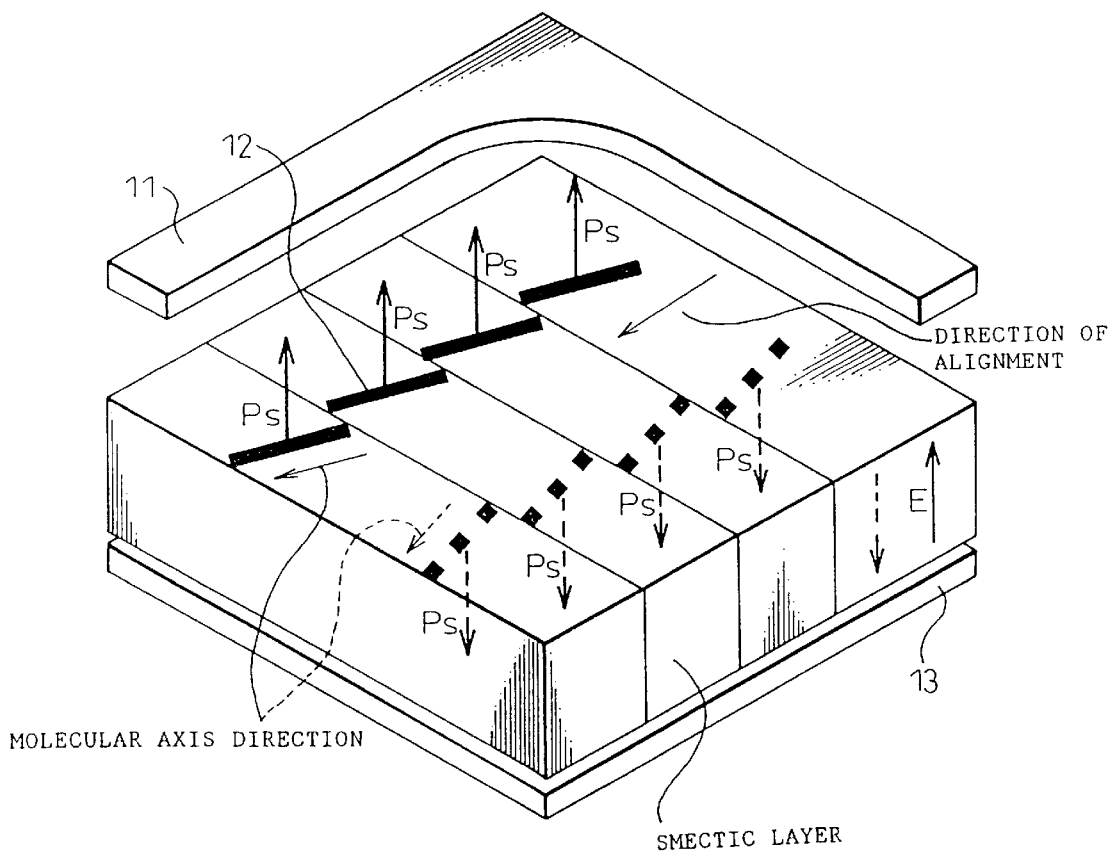
FIG. 2 is a diagram showing the condition in which upward- and downward-directed electric fields are applied across the ferroelectric liquid crystal.

FIG. 1 is a diagram showing a surface stabilized state of a ferroelectric liquid crystal. When the spacing between a top transparent substrate 11 and a bottom transparent substrate 13 is a few micrometers, the smectic layers are perpendicular to the top and bottom transparent substrates. In this situation, each smectic layer is stable in either one of states, i.e., the state in which spontaneous polarization (Ps<0) points upward and the molecular axis is tilted to the right (molecular model indicated by solid line) or the state in which the spontaneous polarization points downward and the molecular axis is tilted to the left (molecular model indicated by dotted line), and the two stable states exist simultaneously. An alignment film is formed on each of the top and bottom transparent substrate and a treatment for a direction of alignment is made to control the orientation of the smectic layers, the direction of alignment being oriented in the direction of orientation of the ferroelectric liquid crystal smectic layers. FIG. 2 is a diagram showing the condition in which upward- and downward-directed electric fields are applied across the ferroelectric liquid crystal. When the electric field is applied in the upward direction (the direction indicated by solid line E), the liquid crystal is set into a rightward-tilted ferroelectric state with the molecules as a whole tilted rightward by an angle θ relative to the direction of alignment, and the molecular axis is also tilted rightward by θ. When the applied electric field is reversed to point in the downward direction (the direction indicated by dotted line E), the liquid crystal is then set into a leftward-tilted ferroelectric state with the molecules as a whole tilted leftward by θ relative to the direction of alignment, and the molecular axis is also tilted leftward by θ.

Figure 3:
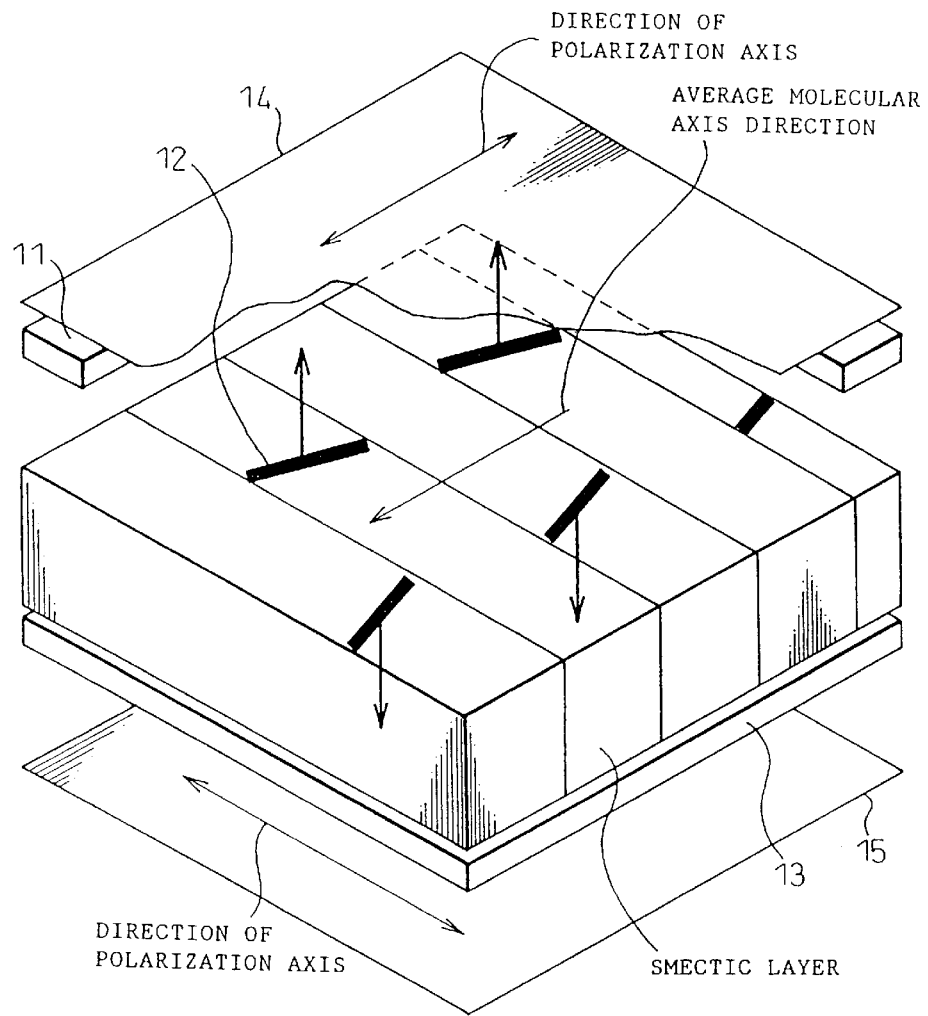
FIG. 3 is a diagram showing a surface stabilized state of an antiferroelectric liquid crystal.

FIG. 3 is a diagram showing a surface stabilized state of an antiferroelectric liquid crystal. The antiferroelectric liquid crystal also possesses spontaneous polarization, and forms a smectic layer structure. A treatment for a direction of alignment is made to provide the direction of alignment which is the direction of the smectic layers. However, unlike the ferroelectric liquid crystal, the direction of the spontaneous polarization is changed every one or every few layers, to mutually cancel the spontaneous polarization and obtain a stable antiferroelectric state. In the antiferroelectric state shown in FIG. 3, the state in which the direction of the spontaneous polarization is tilted rightward exists alternately with the state in which the direction of the spontaneous polarization is tilted leftward; the molecular axis direction in the antiferroelectric state is represented by the molecular axis direction (hereinafter described as the "average molecular axis direction") obtained by averaging the rightward and leftward tilting molecular axis directions, and this average molecular axis direction substantially coincides with the direction of alignment. When an upward-directed electric field is applied in the antiferroelectric state of FIG. 3, the rightward-tilted ferroelectric state results with the molecules as a whole tilted rightward by θ (the molecular state indicated by solid lines in FIG. 2). When the electric field is applied in the downward direction by reversing the polarity of the applied voltage, the result is the leftward-tilted ferroelectric state with the molecules as a whole tilted leftward by θ (the molecular state indicated by dotted lines in FIG. 2). The polarization axis of a top polarizer 14 is oriented to coincide with the average molecular axis direction in the antiferroelectric state, and the polarization axis of a bottom polarizer 15 is oriented at right angles to that of the top polarizer 14. In the antiferroelectric state, since the polarization axis direction of the top polarizer coincides with the average molecular axis direction and is at right angles to the polarization axis direction of the bottom polarizer, light is not transmitted; this state is the dark state. That is, the axis whose direction coincides with the direction of the polarization axis in the dark state is the average molecular axis. On the other hand, in both the rightward-tilted and leftward-tilted ferroelectric states, light is transmitted because of a displacement between the polarization axis direction and the average molecular axis direction; this state is the bright state. The following description assumes that the polarization axis of the bottom polarizer is oriented at right angles to the polarization axis of the top polarizer, except where specifically noted otherwise.

Figure 4:
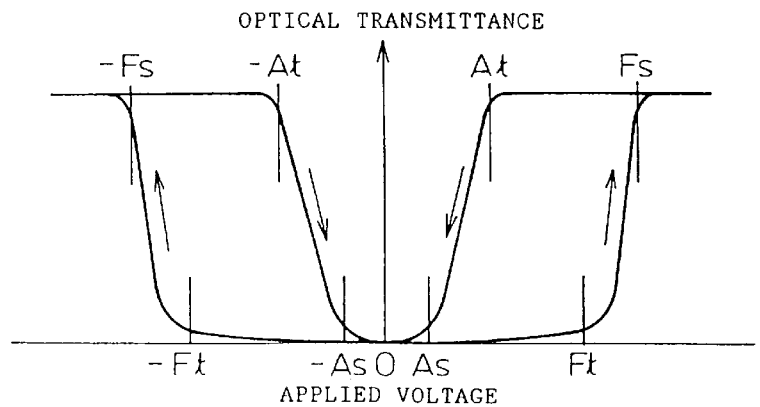
FIG. 4 is a diagram showing the variation of the optical transmittance of an antiferroelectric liquid crystal panel versus the voltage applied thereto.

FIG. 4 is a diagram showing an example of how the optical transmittance of the antiferroelectric liquid crystal changes with applied voltage, with the applied voltage plotted along the horizontal axis and the optical transmittance along the vertical axis.

When an increasing positive voltage (the upward-directed electric field in FIG. 2) is applied to the liquid crystal which is in the antiferroelectric state at point O, the optical transmittance begins to increase abruptly at voltage Ft and almost reaches the maximum optical transmittance at voltage Fs to enter a saturated rightward-tilted ferroelectric state. After that, if the applied voltage is further increased, the optical transmittance remains substantially unchanged. Next, when the applied voltage is gradually decreased, the optical transmittance begins to drop abruptly at voltage At and reaches almost zero at voltage As to return to the antiferroelectric state. Likewise, when the applied voltage is increased from 0V in the negative direction (the downward-directed electric field in FIG. 2), the optical transmittance begins to increase abruptly at voltage −Ft and almost reaches the maximum optical transmittance at voltage −Fs to enter a saturated leftward-tilted ferroelectric state. After that, if the applied voltage is further increased in the negative direction, the optical transmittance remains substantially unchanged. Next, when the applied voltage is gradually brought toward 0V, the optical transmittance begins to drop abruptly at voltage −At and reaches almost zero at voltage −As to return to the antiferroelectric state. Hereinafter, |Ft| will be referred to as the ferroelectric threshold voltage, |Fs| as the ferroelectric saturation voltage, |At| as the antiferroelectric threshold voltage, and |As| as the antiferroelectric saturation voltage.

Generally, a liquid crystal panel having N row electrodes and M column electrodes formed in a matrix array is driven by applying a scan signal to each row electrode via a row electrode driving circuit and a display signal, which is dependent on the display data of each pixel (though the signal may contain a portion that does not depend on the display data), to each column electrode via a column electrode driving circuit, thereby applying to the liquid crystal layer a voltage representating the difference between the scan signal and the display signal (this difference voltage will hereinafter be simply referred to as the composed voltage). The period required to scan all the row electrodes (one vertical scan period) is usually known as one frame (or one field). In liquid crystal driving, the polarity of the drive voltage is reversed for each frame (or for every few frames) to prevent an ill effect on the liquid crystal (for example, deterioration due to polarization of ions).

When attention is paid to the scan signal applied to one row electrode, its vertical scan period consists of N horizontal scan periods (in some cases, an additional period may be included). The horizontal scan period during which a scan voltage (hereinafter called the selection voltage) for determining the display state of the pixels in the active row is applied will be referred to as the selection period tw for that row, and the other horizontal scan periods are collectively called the non-selection period.

Usually, in an antiferroelectric liquid crystal panel, whether the liquid crystal in the antiferroelectric state is maintained in that state or caused to make a transition to the ferroelectric state is determined by the display signal applied during the selection voltage application. For this purpose, it is required to provide a period for resetting the liquid crystal state to the antiferroelectric state prior to the application of the selection voltage; hereinafter, this period is called the relaxation period ts. During a period other than the selection period tw and relaxation period ts, the liquid crystal must be held in the determined state; this period is called the holding period tk.

Figure 5:
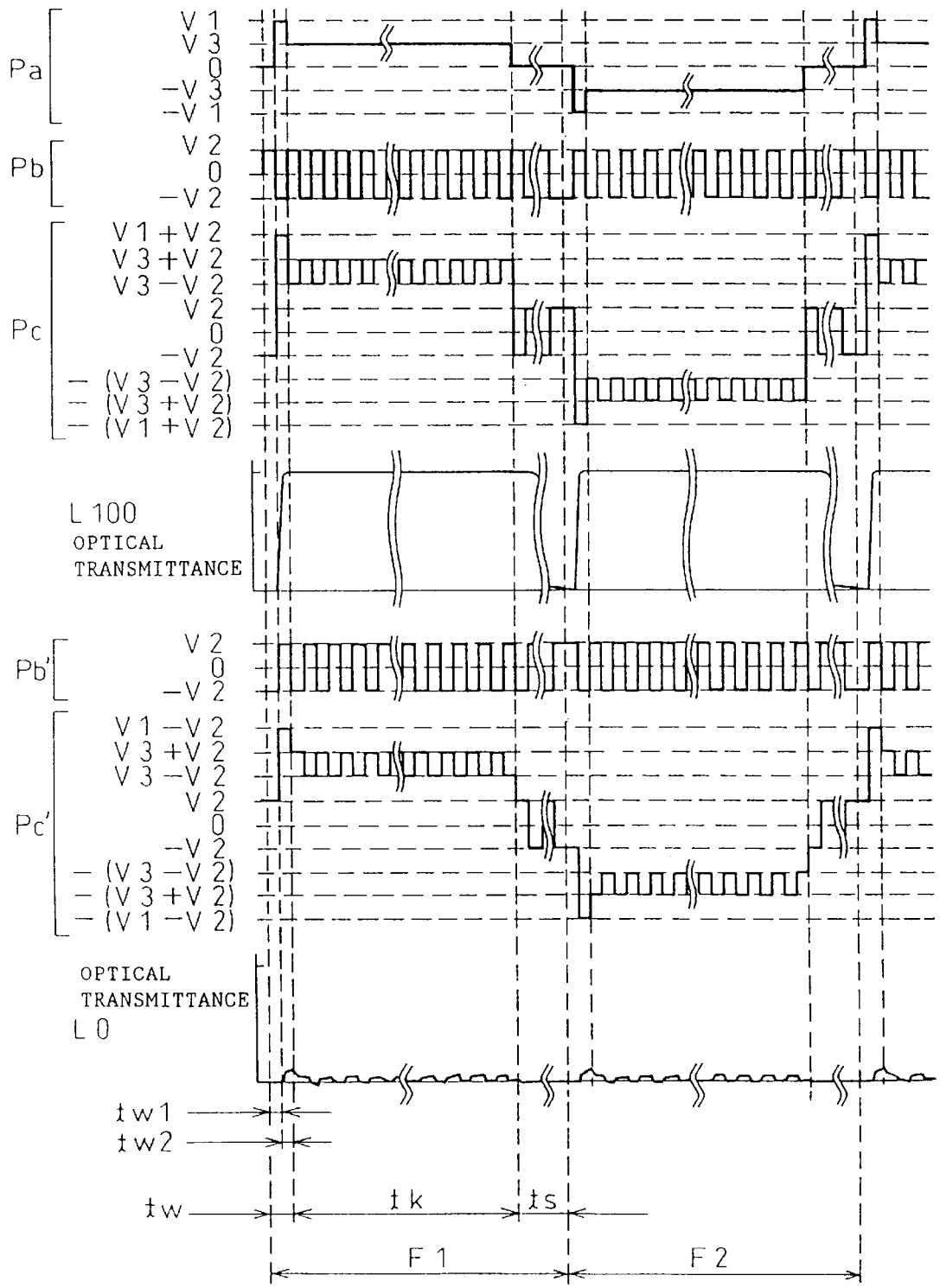
FIG. 5 is a diagram showing voltage waveforms and optical transmittance, illustrating a conventional art drive method.

FIG. 5 is a diagram showing the scan signal waveform (Pa), display signal waveforms (Pb, Pb'), and composed voltage waveforms (Pc, Pc') applied to an arbitrary attention pixel in accordance with the drive method illustrated in FIGS. 1 and 2 in Japanese Unexamined Patent Publication No. 4-362990, along with light transmittance L100, L0.

In FIG. 5, F1 and F2 denote a first frame and a second frame, respectively. The figure shows the case in which the polarity of the drive voltage is reversed for each frame. As can be seen from FIG. 5, the polarity of the drive voltage is simply reversed between the first frame F1 and the second frame F2. As is apparent from FIG. 4, since the liquid crystal display operation is symmetrical relative to the polarity of the drive voltage, the following description deals only with the first frame, except where specifically noted otherwise.

In FIG. 5, one frame is divided into three periods: the selection period tw, the holding period tk, and the relaxation period ts. The selection period tw is further divided into periods tw1 and tw2 of equal length. The voltage of the scan signal Pa in the first frame F1 is set as shown below. Of course, the polarity of the voltage is reversed in the second frame F2. Here, ±V1 is the selection voltage.

| Period              | tw1 | tw2 | tk  | ts |
|---------------------|-----|-----|-----|----|
| Scan signal voltage | 0   | +V1 | +V3 | 0  |

The display signal is set as shown below according to the display state of the attention pixel. Here, symbol * means that the voltage depends on the display data of the other pixels belonging to the same column as the attention pixel.

| Period                   | tw1 | tw2 | tk | ts |
|--------------------------|-----|-----|----|----|
| ON display signal voltage  | +V2 | −V2 | *  | *  |
| OFF display signal voltage | −V2 | +V2 | *  | *  |

If the voltage applied to the liquid crystal during the holding period tk were held in one particular direction depending on the display signal, variation would be caused in the brightness during that period. To avoid this, the polarity of the display signal is usually reversed so that its average value becomes zero over one horizontal scan period. More specifically, the polarity of the display signal is reversed between the period tw1 and the period tw2.

In FIG. 5, Pb, Pc, and L100 indicate the display signal waveform, the composed voltage waveform, and the optical transmittance, respectively, when all the pixels in the column containing the attention pixel are in the ON (bright) state. In this case, if the voltage (composed voltage) applied to the liquid crystal during the period tw2 is $|V1+V2|>|Ft|$ (see FIG. 4), the liquid crystal begins to make a transition to the ferroelectric state, and the optical transmittance increases. In the holding period tk, if $|V3−V2|>|At|$, the bright state can be maintained. In the relaxation period ts, if $|V2|<|As|$, the optical transmittance decreases with time, and the liquid crystal relaxes from the ferroelectric state back into the stable antiferroelectric state.

In FIG. 5, Pb', Pc', and L0 indicate the display signal waveform, the composed voltage waveform, and the optical transmittance, respectively, when all the pixels in the column containing the attention pixel are in the OFF (dark) state. In this case, the dark state can be produced if the composed voltage in the period tw2 is $|V1−V2|<|Ft|$, the voltage applied during the holding period tk is $|V3+V2|<|Ft|$, and the voltage applied during the relaxation period ts is $|V2|<|Ft|$.

Figure 6:
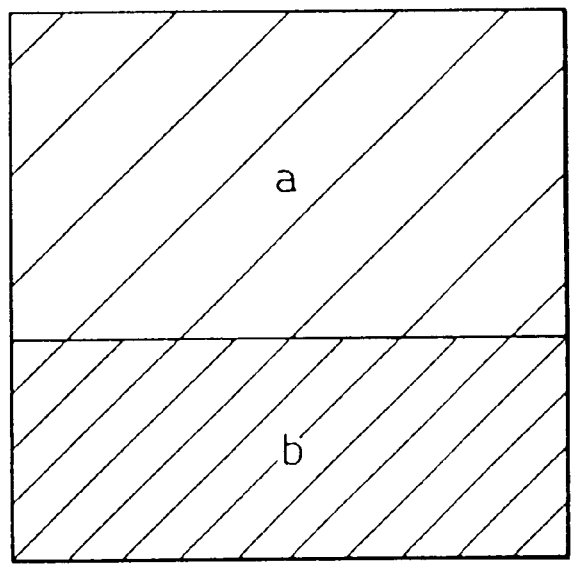
FIG. 6 is a diagram showing a liquid crystal panel where a screen differential phenomenon occurred when power was turned off.

However, it has been observed that when power is turned off while the entire screen of the antiferroelectric liquid crystal panel is in the bright state, a screen differential phenomenon occurs in which the screen is split into upper and lower halves of different brightness levels. FIG. 6 shows a liquid crystal panel where the screen differential phenomenon occurred when power was turned off. In the screen shown in FIG. 6, the region of the upper screen a is brighter than the region of the lower screen b. Though the screen differential phenomenon does not occur in every liquid crystal panel, if it does occurs, the screen differential phenomenon is always visually observable on the liquid crystal panel. However, there is no reproducibility about the location of the upper/lower screen boundary, and also, in some cases, the upper screen is brighter than the lower screen, and in other cases, the lower screen is brighter than the upper screen. With display patterns other than the entire screen bright state, a similar phenomenon has been observed to occur, the phenomenon differing depending on the display pattern. This has lead to the problem that the display screen of the liquid crystal panel, in the absence of an applied voltage, is not uniform, degrading the display quality.

It has also been observed that when power is turned on to the liquid crystal panel that exhibited a screen differential phenomenon when power was turned off, the same screen differential phenomenon that occurred at power off appears in the black display portion of the screen.

Figure 7:
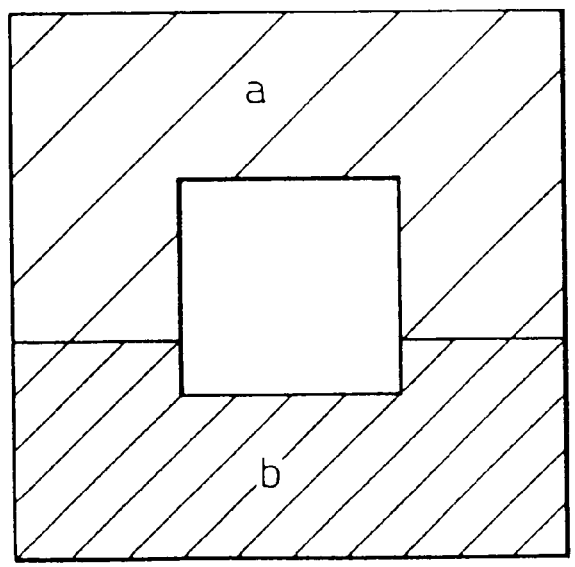

FIG. 7 shows a liquid crystal panel where the screen differential phenomenon occurred when power was turned on. In the screen shown in FIG. 7, a white display is produced in the center area, and the other area is displayed black. In the black display area, the region of the upper screen a is brighter than the region of the lower screen b.

In view of the above situation, the present invention is aimed at preventing the screen from being split into different brightness regions, causing unevenness across the screen, when liquid crystal driving power is turned off to the antiferroelectric liquid crystal display apparatus, and also at preventing the screen differential phenomenon from occurring in the black display portion of the screen when power is turned on.

The present inventor conducted an experiment by noting the average molecular axis direction in the antiferroelectric state after the leftward-tilted ferroelectric state and also after the rightward-tilted ferroelectric state. As the result of the experiment, it has been found that there occurs a displacement between the average molecular axis direction in the antiferroelectric state after returning from the rightward-tilted ferroelectric state and that after returning from the leftward-tilted ferroelectric state, and that there also occurs a displacement between the direction of alignment and the average molecular axis direction in the antiferroelectric state.

FIG. 8 is a diagram for explaining a rightward-tilted antiferroelectric state and a leftward-tilted antiferroelectric state. As shown in FIG. 8(a), a voltage of −50V is applied to the liquid crystal panel for 20 ms, followed by the application of a 0V voltage for 20 ms as a relaxation period, and then a voltage of 50V is applied for 20 ms, followed by the application of a 0V voltage for 20 ms as a relaxation period. When −50V is applied, the downward-directed electric field shown in FIG. 2 is occurred causing the liquid crystal in the antiferroelectric state to change state to the leftward-tilted ferroelectric state, and during the subsequent 0V relaxation period, the liquid crystal relaxes back into the antiferroelectric state. Next, with the application of the 50V voltage, the upward-directed electric field shown in FIG. 2 is occurred, causing the state to change to the rightward-tilted ferroelectric state, and during the subsequent OV relaxation period, the liquid crystal relaxes back into the antiferroelectric state. The resulting liquid crystal state is called the rightward-tilted antiferroelectric state. As shown in FIG. 8(b), a voltage of 50V is applied to the liquid crystal panel for 20 ms, followed by the application of a OV voltage for 20 ms as a relaxation period, and then a voltage of −50V is applied for 20 ms, followed by the application of a OV voltage for 20 ms as a relaxation period. With the application of 50V, the upward-directed electric field shown in FIG. 2 is occurred, causing the state to change from the antiferroelectric state to the rightward-tilted ferroelectric state, and during the subsequent OV relaxation period, the liquid crystal relaxes back into the antiferroelectric state. Next, with the application of −50V, the downward-directed electric field shown in FIG. 2 is occurred, causing the state to change to the leftward-tilted ferroelectric state and, during the subsequent OV relaxation period, the liquid crystal relaxes back into the antiferroelectric state. The resulting liquid crystal state is called the leftward-tilted antiferroelectric state.

Figure 9:
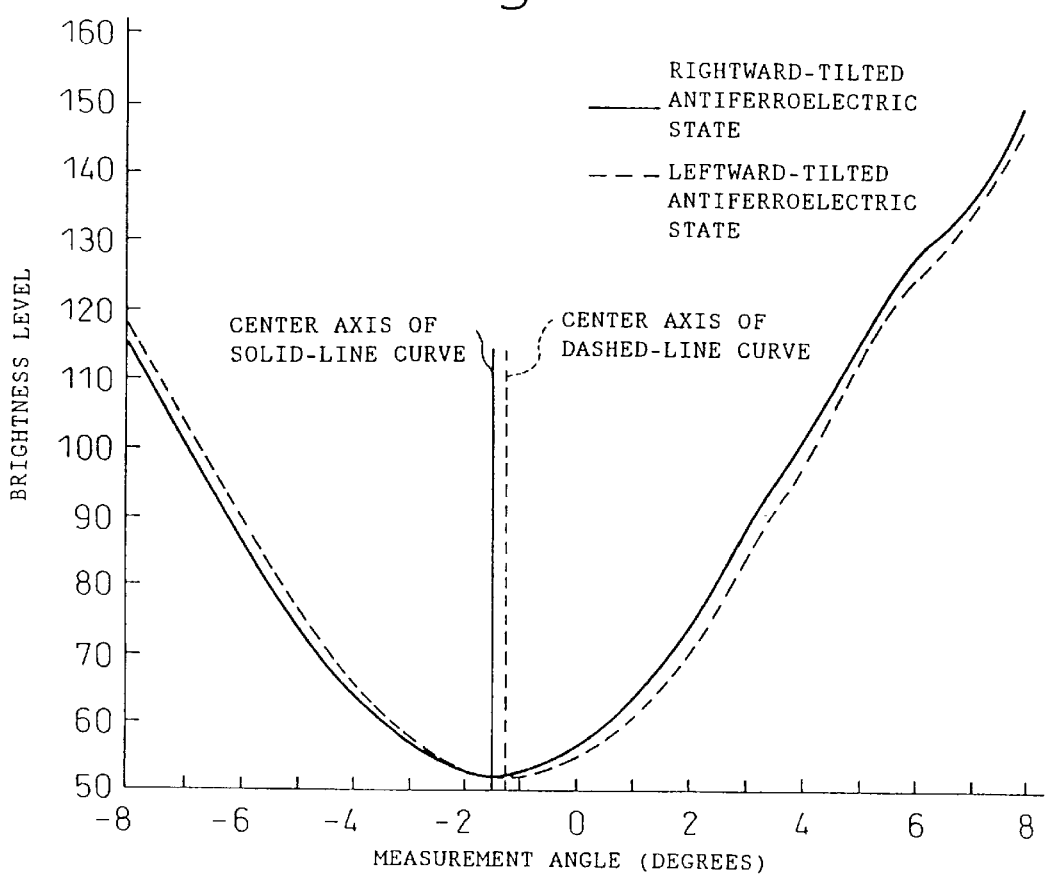
FIG. 9 is a diagram showing a displacement between the average molecular axis direction in the rightward-tilted antiferroelectric state and that in the leftward-tilted antiferroelectric state.
Figure 10:
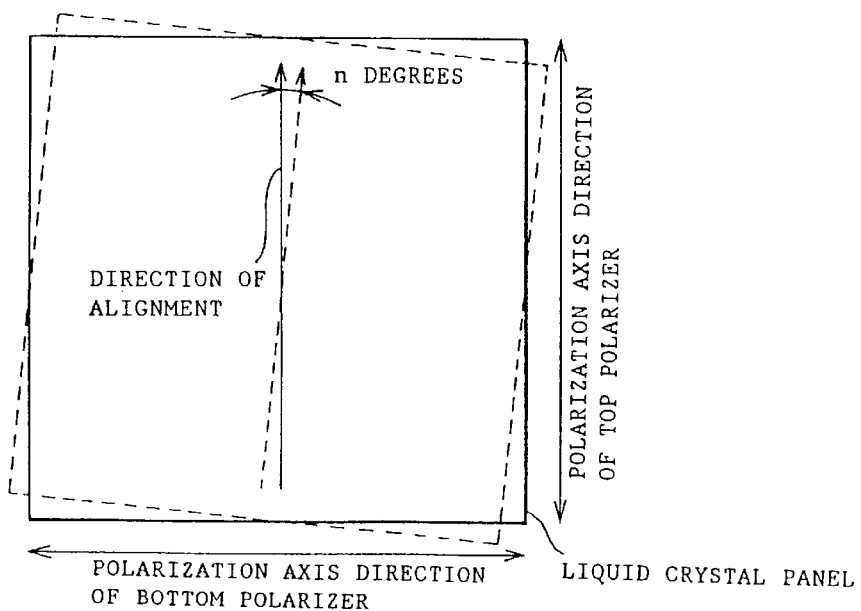
FIG. 10 is a schematic diagram showing a position setup for brightness measurement.

FIG. 9 is a graph showing the displacement between the average molecular axis direction in the rightward-tilted antiferroelectric state and that in the leftward-tilted antiferroelectric state. In FIG. 9, the horizontal axis represents the measurement angle, and the vertical axis the brightness level describing the brightness by levels corresponding to optical transmittance. The 0 degree on the horizontal axis represents the direction of alignment of the liquid crystal panel. The method of plotting the graph of FIG. 9 will be described using FIG. 10. FIG. 10 is a schematic diagram showing position setup for brightness measurement. In the present invention, measurements were made by placing the liquid crystal panel on the rotating specimen table of a polarization microscope (Olympus BHS-751-P-SP). The liquid crystal panel is set into the rightward-tilted ferroelectric state by the application of the voltage waveform shown in FIG. 8(a). The direction of alignment of the liquid crystal panel is aligned with the direction of the polarization axis of the top polarizer mounted on the polarization microscope; the polarization axis of the bottom polarizer is oriented at right angles to the polarization axis of the top polarizer. A CCD (Sony DXC-108) is mounted on the polarization microscope, and an image captured by the CCD is stored as image data of 640×480 pixels in the JPEG file format on a workstation (JAPAN HP 9000 Series 725-100) equipped with an add-on video capture board (Pallax PV-700). Using image analysis software (Mitani Shoji WinRoof), the JPEG file is read and an image analysis is performed to determine the brightness level of each pixel out of 256 levels ranging from dark to bright (the number of levels depends on the image analysis software used) and compute the average brightness level of the specific image region. The thus computed average brightness level of the liquid crystal panel in the rightward-tilted antiferroelectric state is plotted against the 0-degree measurement angle on the horizontal axis of FIG. 9. That is, the measurement angle when the direction of alignment of the liquid crystal panel coincides with the direction of the polarization axis of the top polarizer is defined as 0 degree, and the average brightness level at this time is plotted against the measurement angle of 0 degree. Next, with the top and bottom polarizers of the polarization microscope intact, the liquid crystal panel is rotated to the right by n degrees, as shown by dashed lines in FIG. 10, and the average brightness level is computed. When n is 2, the computed average brightness level is plotted against the measurement angle of 2 degrees on the horizontal axis. Further, the liquid crystal panel is rotated counterclockwise by n degrees, and the average brightness level is computed. When n is 2, the computed average brightness level is plotted against the measurement angle of −2 degrees on the horizontal axis. The above process is repeated to measure the brightness level at each measurement angle, and a curve is drawn by plotting the measurements.

The same process is repeated for the leftward-tilted antiferroelectric state, and the curve shown by the dashed line in FIG. 9 is obtained.

In FIG. 9, the solid line is for the antiferroelectric liquid crystal in the rightward-tilted antiferroelectric state, and the dashed line for the leftward-tilted antiferroelectric state.

Figure 11:
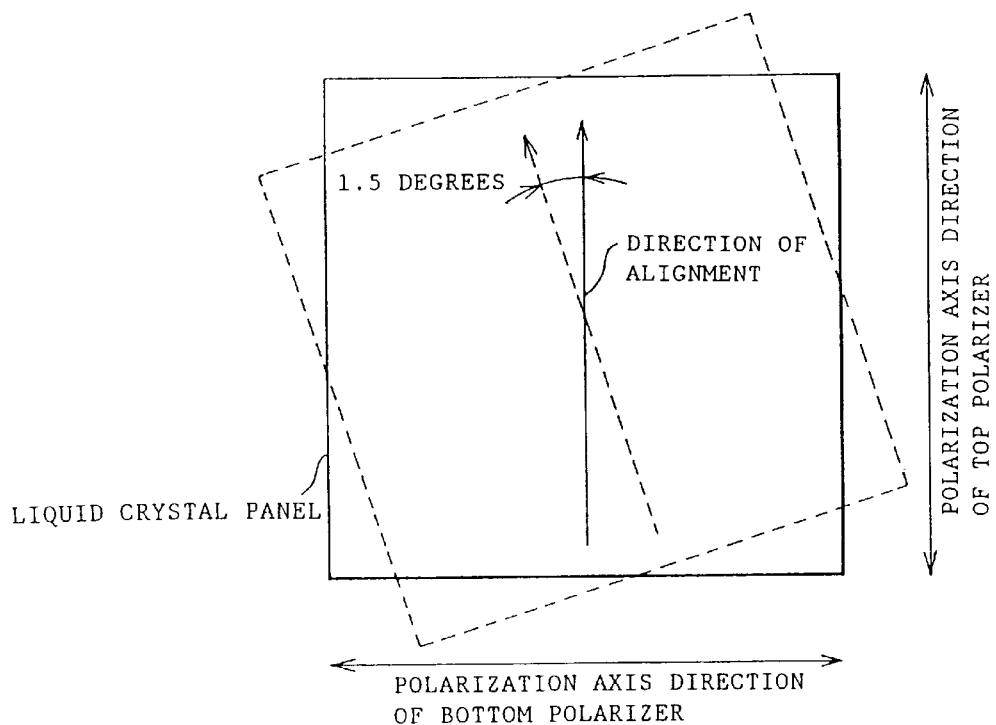
FIG. 11 is a diagram for explaining a procedure for obtaining an intrinsic antiferroelectric axis direction.

As shown in FIG. 9, both the brightness curve for the rightward-tilted antiferroelectric state and that for the leftward-tilted antiferroelectric state are substantially sinusoidal. When the center axis about which the brightness curve has mirror symmetry across a plane parallel to the Y axis is obtained from FIG. 9, it can be shown that the center axis for the rightward-tilted antiferroelectric state is at −1.5 degrees and that for the leftward-tilted antiferroelectric state is at −1.25 degrees. The average molecular axis direction in either antiferroelectric state can be found from this center axis. More specifically, when the antiferroelectric liquid crystal is in the rightward-tilted antiferroelectric state, the brightness level becomes minimum when the direction of alignment is rotated counterclockwise by an angle of 1.5 degrees relative to the direction of the polarization axis of the top polarizer, as shown in FIG. 11; in the case of the leftward-tilted antiferroelectric state, the brightness level becomes minimum when the direction of alignment is rotated counterclockwise by an angle of 1.25 degrees relative to the direction of the polarization axis of the top polarizer. As earlier noted, the axis whose direction coincides with the direction of the polarization axis in the maximum dark state is the average molecular axis.

Figure 12:
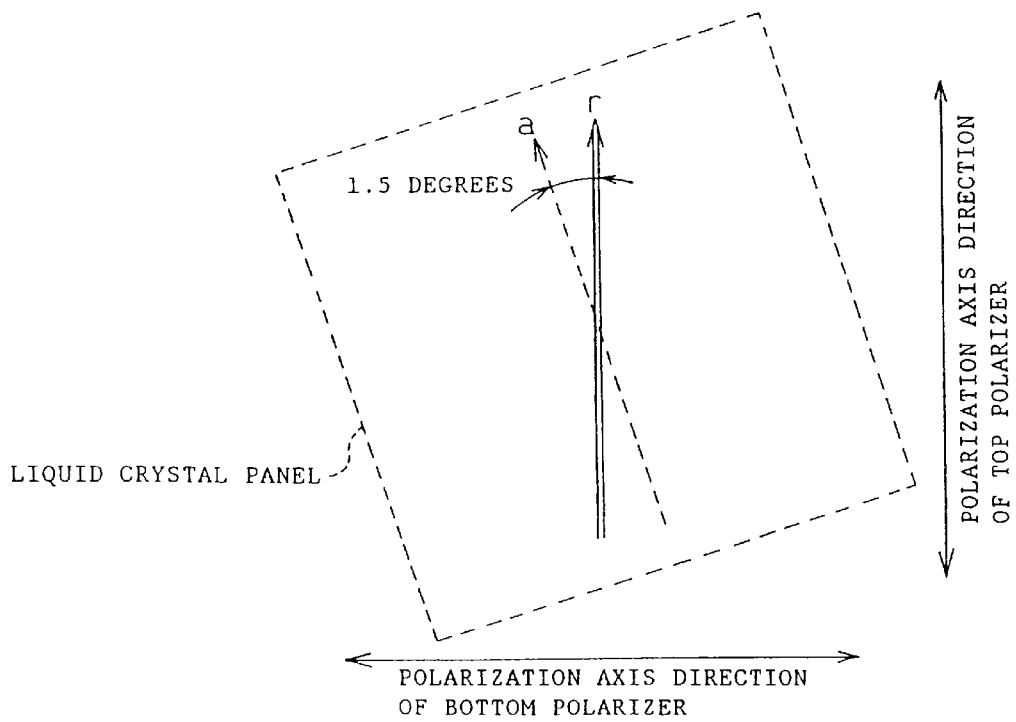
FIG. 12 is a diagram for explaining a procedure for obtaining the intrinsic antiferroelectric axis direction.

Accordingly, if the brightness level is minimum when the liquid crystal panel in the rightward-tilted antiferroelectric state is rotated counterclockwise by an angle of 1.5 degrees relative to the direction of the polarization axis of the top polarizer, as shown in FIG. 11, then the average molecular axis direction of the liquid crystal panel in the rightward-tilted antiferroelectric state is the direction indicated by double solid line r, as shown in FIG. 12, which is the same direction as the direction of the polarization axis. Here, dashed line a indicates the direction of alignment of the liquid crystal panel. The average molecular axis direction of the liquid crystal panel in the leftward-tilted antiferroelectric state can be found in a like manner.

Figure 13:
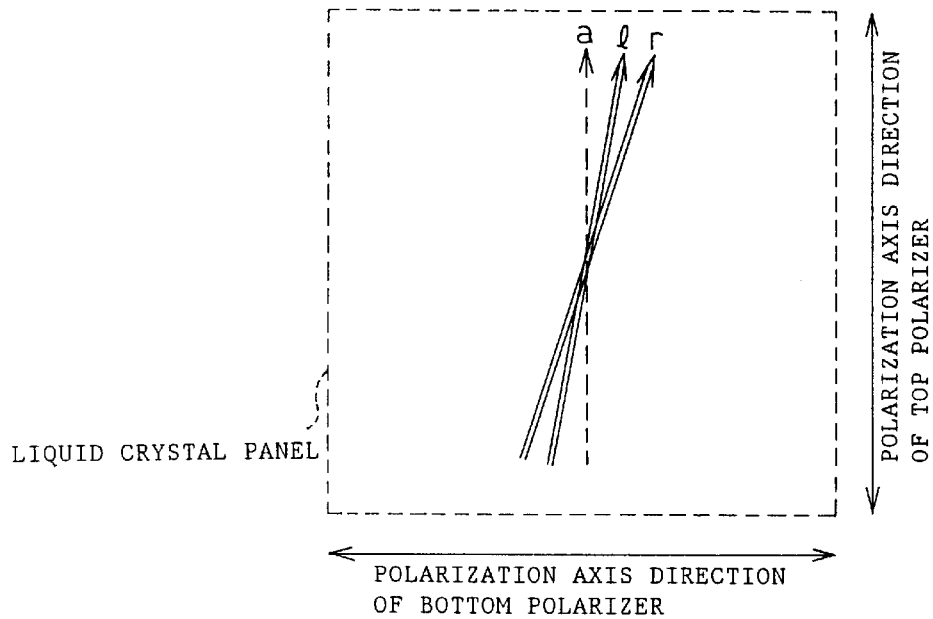
FIG. 13 is a diagram for explaining a procedure for obtaining the intrinsic antiferroelectric axis direction.

FIG. 13 is a diagram showing the average molecular axis directions of the liquid crystal panel, one in the rightward-tilted antiferroelectric state and the other in the leftward-tilted antiferroelectric state, in relation to the polarization axis. In FIG. 13, r indicates the average molecular axis direction in the rightward-tilted antiferroelectric state, and l the average molecular axis direction in the leftward-tilted antiferroelectric state. Further, a indicates the direction of alignment of the liquid crystal panel.

In FIG. 13, the average molecular axis direction r is displaced 1.5 degrees rightward, and l is displaced 1.25 degrees rightward, relative to the direction of alignment, a. The average molecular axis direction r is tilted further rightward compared with the average molecular axis direction l, the displacement between r and l being 0.25 degrees.

For example, when the direction of the polarization axis of the top polarizer is aligned with the average molecular axis direction in the leftward-tilted antiferroelectric state, that is, at −1.25 degrees in the measurement angle in FIG. 9, the liquid crystal panel in the leftward-tilted antiferroelectric state shows the maximum dark state, and its brightness level is 52.0. In this case, the brightness level of the liquid crystal panel, when in the rightward-tilted antiferroelectric state, is 52.2, which is slightly higher than the brightness level of the maximum dark state. However, this brightness difference of 0.2 is so small that the difference is not visually recognizable. When the direction of the polarization axis of the top polarizer is aligned with the average molecular axis direction in the rightward-tilted antiferroelectric state, the brightness difference is also small and not visually recognizable. However, when the measurement angle in FIG. 9 is 1 degree, the brightness level increases because a displacement occurs between the average molecular axis direction in each antiferroelectric state and in the direction of the polarization axis. As shown in FIG. 9, the brightness level is 60.2 in the leftward-tilted antiferroelectric state and 63.5 in the rightward-tilted antiferroelectric state, the difference being as large as 3.3. This difference is visually recognizable.

From the above, it is presumed that the screen differential phenomenon at the time of power off occurs for the following reason. In the prior art drive method illustrated in FIG. 5, since the polarity is changed from frame to frame, there can occur cases in which the rightward-tilted ferroelectric state and the leftward-tilted ferroelectric state exist simultaneously within the same screen. That is, as shown in FIG. 5, the polarity of the scan voltage is reversed from one frame to the next, and positive and negative voltages are applied alternately. Accordingly, within one frame, when the scanning with the positive scan voltage is halfway through the frame, the leftward-tilted and rightward-tilted ferroelectric states exist simultaneously. If the leftward-tilted and rightward-tilted ferroelectric states exist simultaneously within the same screen when power is turned off, this also means that the two antiferroelectric states, leftward-tilted and rightward-tilted states, exist simultaneously. When the direction of the polarization axis of the top polarizer is substantially aligned with the average molecular axis direction in each of the two antiferroelectric states, the screen differential phenomenon does not occur since the brightness difference between the two antiferroelectric states is small. However, when the direction of the polarization axis of the top polarizer is substantially displaced from the average molecular axis direction in each of the two antiferroelectric states, the brightness difference between the two antiferroelectric states increases, and the screen differential phenomenon occurs. Since the screen differential phenomenon is largely dependent on the accuracy to which the polarizer is bonded to the liquid crystal panel, the screen differential phenomenon occurs, or does not occur, depending on the liquid crystal panel used.

In liquid crystal panels of conventional mode, for example, STN or TFT, it has been practiced to register the polarizer by reference to the direction of alignment. However, if the registration accuracy of the polarizer is somehow lost, the contrast may drop somewhat or the hue may change slightly; this, however, has not been much of a problem since the differences are not easily recognizable by the human eye. Therefore, the registration accuracy of the polarizer has been less of an issue. Polarizers that caused the screen differential phenomenon were bonded in accordance with the registration method and registration accuracy practiced in conventional mode. Suppose that the average molecular axis direction is the same between the leftward-tilted and rightward-tilted antiferroelectric states; in this case, if a substantial displacement occurs between the direction of the polarization axis and the average molecular axis direction, the screen differential phenomenon does not occur since a brightness difference does not occur, though the brightness increases. Further, if the direction of alignment is substantially aligned with the average molecular axis direction, the screen differential phenomenon does not easily occur even when the leftward-tilted and rightward-tilted antiferroelectric states exist simultaneously, because the brightness difference is not large enough. However, if the direction of the polarization axis is substantially displaced much from the average molecular axis direction, and if there is a displacement between the average molecular axis direction in the leftward-tilted antiferroelectric state and that in the rightward-tilted antiferroelectric state, then the screen differential phenomenon occurs.

Figure 14:
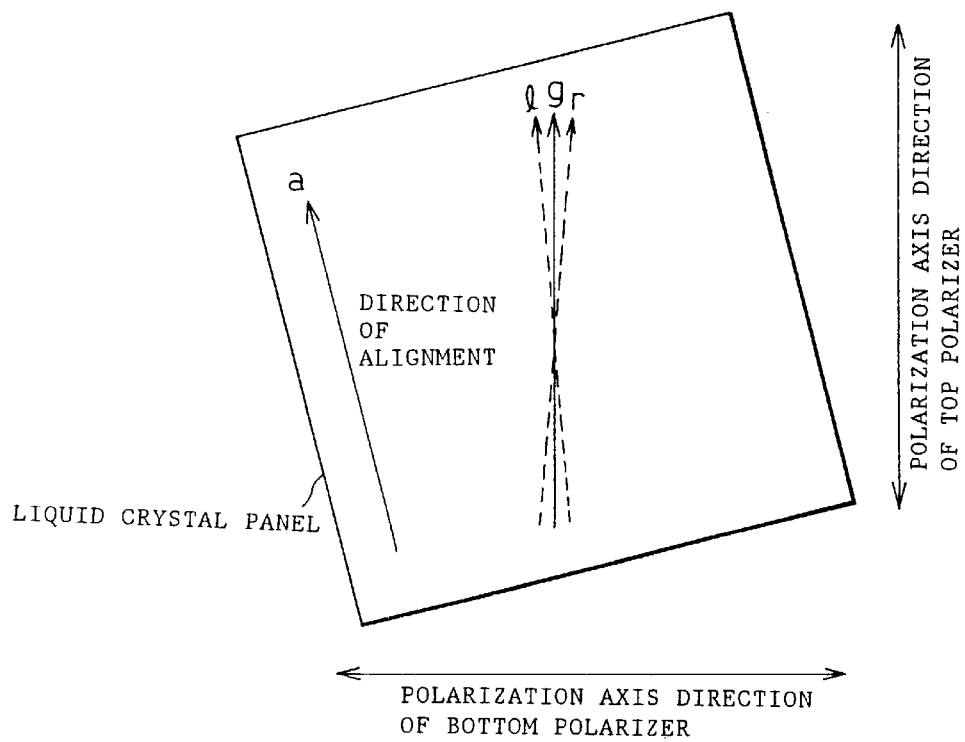
FIG. 14 is a diagram showing the relationships between the direction of alignment, average molecular axis direction, polarization axis direction, and intrinsic antiferroelectric axis direction of the liquid crystal panel in the antiferroelectric liquid crystal display apparatus of the present invention.

Embodiments of the present invention will now be described in detail below. FIG. 14 is a diagram showing the relationships between the direction of alignment, average molecular axis direction, and polarization axis direction of the liquid crystal panel in the antiferroelectric liquid crystal display apparatus of the present invention. In the figure, a indicates the direction of alignment of the liquid crystal panel, r the average molecular axis direction in the rightward-tilted antiferroelectric state, and l the average molecular axis direction in the leftward-tilted antiferroelectric state. In the present invention, an intrinsic antiferroelectric axis direction g is set between the average molecular axis directions r and l. Though not shown here, the antiferroelectric liquid crystal display apparatus comprises two substrates each having a set of electrodes and an alignment film formed thereon; the sets of electrodes formed on the respective substrates are disposed opposing each other across a gap, the alignment film is formed on each of the opposing surfaces of the substrates sandwiching therebetween a liquid crystal sealed with a sealant along the periphery thereof, and a polarizer is attached to the surface of each substrate opposite the opposing surface thereof. The polarization axis of the top polarizer is oriented at right angles to the polarization axis of the bottom polarizer.

The display apparatus above is described as having two substrates, but three or more substrates may be provided. Further, for the polarizer, any type of polarizer may be used, including a polarizing prism.

Figure 15:
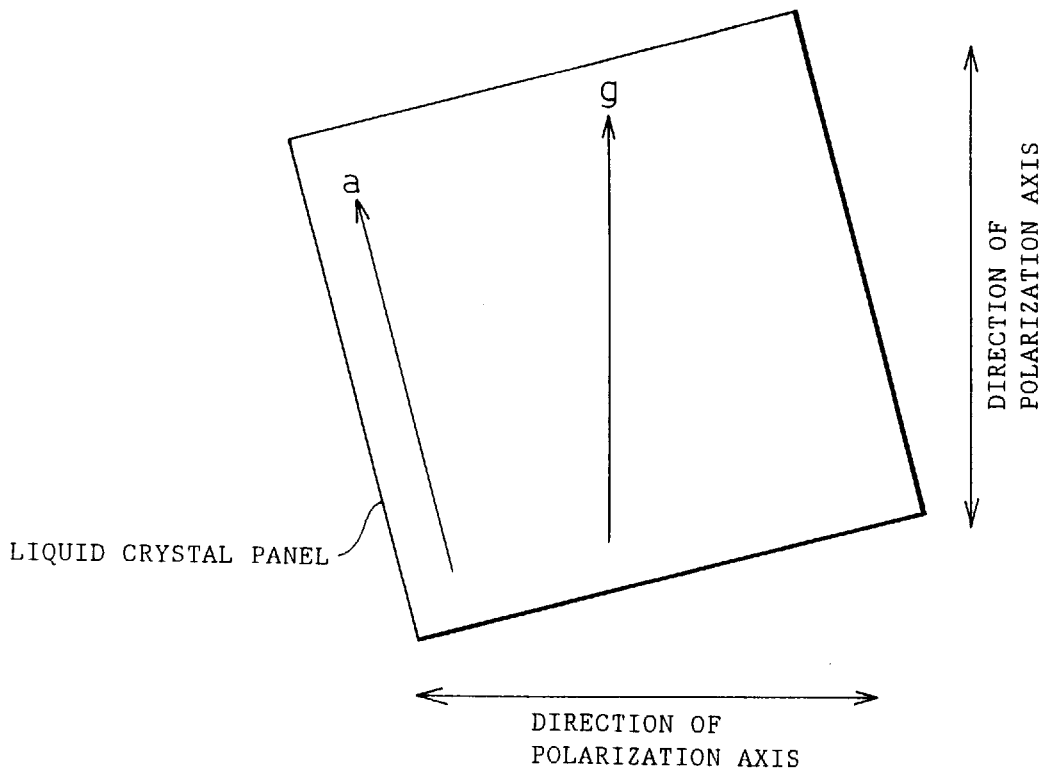
FIG. 15 is a diagram showing one embodiment of the antiferroelectric liquid crystal display apparatus of the present invention.

FIG. 15 is a diagram showing one embodiment of the antiferroelectric liquid crystal display apparatus of the present invention. The liquid crystal panel is arranged so that its intrinsic antiferroelectric axis direction g is aligned to be oriented in the same direction of the polarization axis of one of the two crossed polarizers. In this case, it is assumed that the average molecular axis direction r in the rightward-tilted antiferroelectric state is set at 1.5 degrees and the average molecular axis direction l in the leftward-tilted antiferroelectric state at 1.25 degrees, for example, as described in connection with FIG. 13. Then, the intrinsic antiferroelectric axis direction g, if set at midpoint between them, is at 1.375 degrees. In this arrangement, when power is turned off after driving the liquid crystal, if the rightward-tilted antiferroelectric state and the leftward-tilted antiferroelectric state exist simultaneously, the brightness difference is small and not recognizable by the human eye since the average molecular axis direction r in the rightward-tilted antiferroelectric state and the average molecular axis direction l in the leftward-tilted antiferroelectric state are respectively displaced from the intrinsic antiferroelectric axis direction g by only 0.125 degrees. Accordingly, if power is turned on again after being turned off, unevenness of brightness does not occur.

In the above arrangement, the intrinsic antiferroelectric axis direction g is set at the midpoint between the average molecular axis directions r and l, but it need not necessarily be set at exact midpoint but may be set at an appropriate point intermediate between the average molecular axis directions r and l.

Figure 16:
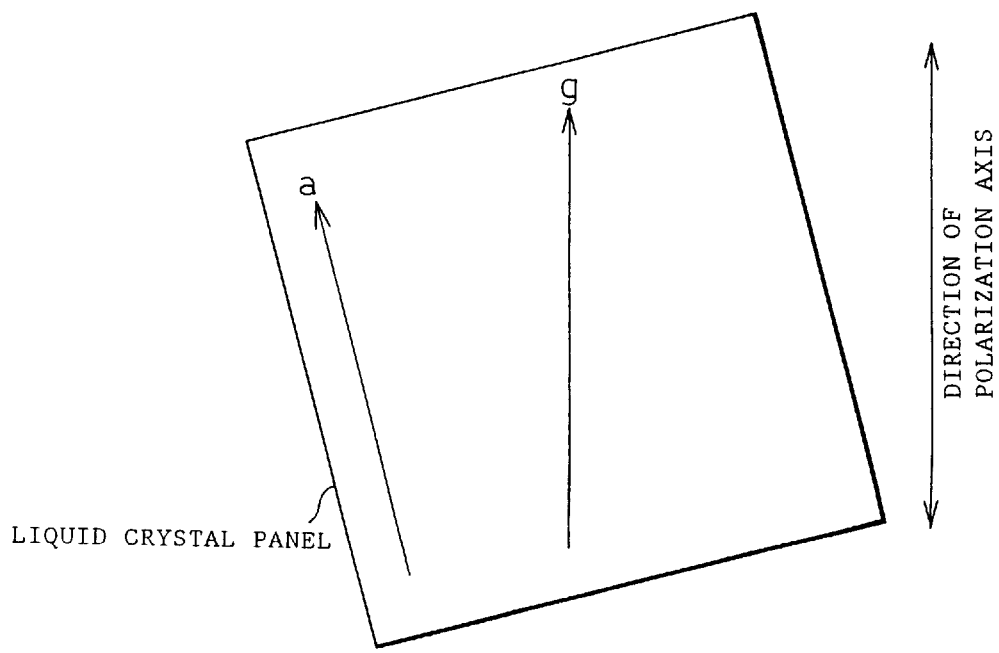
FIG. 16 is a diagram showing another embodiment of the antiferroelectric liquid crystal display apparatus of the present invention.

FIG. 16 is a diagram showing another embodiment of the antiferroelectric liquid crystal display apparatus of the present invention. In the first embodiment shown in FIG. 15, two polarizers are provided, their axes being oriented at right angles to each other. In contrast, in the embodiment shown in FIG. 16, at least one polarizer is provided, and said polarizer may be disposed so that the intrinsic antiferroelectric axis direction g is aligned to be oriented in the same direction as the polarization axis of said polarizer. In other respects, the arrangement is the same as that shown in FIG. 15.

In the above embodiments, the intrinsic antiferroelectric axis direction g is oriented in the same direction as the direction of the polarization axis, but a displacement within ±1 degree can be allowed.

In the above description, the rightward-tilted ferroelectric state, the leftward-tilted ferroelectric state, the rightward-tilted antiferroelectric state, and the leftward-tilted antiferroelectric state are reversed right and left when viewed from the bottom transparent substrate compared to being viewed from the top transparent substrate. Further, it can easily be understood that the relationship between the upward- and downward-directed electric fields and the positive and negative polarities is reversed when the electric field is applied from the bottom transparent substrate compared to being applied from the top transparent substrate. The examples so far shown are only illustrative and given to facilitate the explanation of the present invention, and it will be appreciated that the relationship between the upward- and downward-directed electric fields and the positive and negative polarities does not determine the sense of the antiferroelectric state.

Next, a method of obtaining the intrinsic antiferroelectric axis direction of the antiferroelectric liquid crystal panel will be described in detail below. FIG. 17 is a flowchart illustrating a procedure for obtaining the intrinsic antiferroelectric axis direction. When this procedure is initiated (S1), first the antiferroelectric liquid crystal is set into the rightward-tilted antiferroelectric state (S2). Next, the angle of the polarization axis of the polarizer relative to a reference axis of the liquid crystal panel is varied (S3), and the brightness level of the liquid crystal panel at each angle is measured (S4). Next, it is determined whether the brightness level has been measured at all angles within a predetermined range (S5). The angular range over which to measure the brightness level, for example, an angular range of ±n degrees, is predetermined. If the brightness level has not yet been measured at all angles within the predetermined range (NO), the process returns to S3 where the angle is varied once again to measure the brightness level. In the answer is YES in S5, the angle at which the measured brightness level is minimum is detected (S6). Then, the average molecular axis direction in the rightward-tilted antiferroelectric state is obtained from the angle at which the brightness level is minimum (S7).

Next, the antiferroelectric liquid crystal is set into the leftward-tilted antiferroelectric state (S8), and the same processing as in S3 to S6 above is performed to detect the angle at which the measured brightness level is minimum (S9). Then, the average molecular axis direction in the leftward-tilted antiferroelectric state is obtained from the angle at which the brightness level is minimum (S10).

Next, the intrinsic antiferroelectric axis is set between the average molecular axis direction in the rightward-tilted antiferroelectric state and that in the leftward-tilted antiferroelectric state (S11), and the process is terminated (S12).

In the above flow, the angle at which the brightness level is minimum is detected, and the average molecular axis direction in each antiferroelectric state is obtained from the detected angle. Depending on the panel display condition, however, there are cases in which the average molecular axis direction in each antiferroelectric state can be obtained from the angle at which the brightness level is maximum. Therefore, in the above flow, "minimum" can be replaced by "maximum". Further, the intrinsic antiferroelectric axis direction should only be set between the average molecular axis direction in the rightward-tilted antiferroelectric state and that in the leftward-tilted antiferroelectric state. It would, however, be better to set the intrinsic antiferroelectric axis direction at midpoint between the left and right average molecular axis directions.

For the reference axis of the liquid crystal panel, the scribe direction of the liquid crystal panel, i.e., the cut direction of the substrate that is cut after alignment treatment, the deposition direction of ITO which is the arrangement direction of the electrodes, the direction of alignment of the liquid crystal, the arrangement direction of the black matrix on the substrate, or the arrangement direction of the sealant sealing the periphery of the liquid crystal can be used.

Next, an alternative method of obtaining the intrinsic antiferroelectric axis direction will be described in detail below. FIG. 18 is a flowchart illustrating a procedure according to the alternative method for obtaining the intrinsic antiferroelectric axis direction. When the procedure is initiated (S1), first the antiferroelectric liquid crystal is set into the rightward-tilted antiferroelectric state (S2), and then the angle of the polarization axis of the polarizer relative to the reference axis of the liquid crystal panel is varied (S3). Next, the average brightness level of the attention image region is computed at each angle (S4), and the thus computed average brightness level is plotted to the brightness level along the vertical axis against the angle on the horizontal axis of the graph (S5). Next, it is determined whether the brightness characteristic curve for the rightward-tilted antiferroelectric state is completed or not (S6), and if not completed yet, the processing in steps S3 to S6 is repeated by varying the angle in S3, to draw the brightness characteristic curve until the curve is completed. When the brightness characteristic curve is completed (YES at S6), the average molecular axis direction in the rightward-tilted antiferroelectric state is obtained from the angle at which the brightness level on the brightness characteristic curve is minimum (S7).

Next, the antiferroelectric liquid crystal is set into the leftward-tilted antiferroelectric state (S8), and the same processing as in S3 to S6 above is performed to construct the brightness characteristic curve for the leftward-tilted antiferroelectric state (S9). Then, the average molecular axis direction in the leftward-tilted antiferroelectric state is obtained from the angle at which the brightness level is minimum (S10).

Next, the intrinsic antiferroelectric axis is set between the average molecular axis direction in the rightward-tilted antiferroelectric state and that in the leftward-tilted antiferroelectric state (S11), and the process is terminated (S12).

In the above flow, the average molecular axis direction in each antiferroelectric state is obtained from the angle at which the brightness level is minimum. Depending on the panel display condition, however, there are cases in which the average molecular axis direction in each antiferroelectric state can be obtained from the angle at which the brightness level is maximum. For example, if the top and bottom polarizers are oriented parallel to each other, the average molecular axis direction in each antiferroelectric state can be obtained from the angle at which the brightness level is maximum. Therefore, in the above flow, "minimum" can be replaced by "maximum".

Further, the intrinsic antiferroelectric axis direction should only be set between the average molecular axis direction in the rightward-tilted antiferroelectric state and that in the leftward-tilted antiferroelectric state. It would, however, be better to set the intrinsic antiferroelectric axis direction at midpoint between the left and right average molecular axis directions.

Alternatively, an axis that serves as the mirror symmetry axis of the brightness characteristic curve may be obtained first, and then the average molecular axis direction may be obtained from the angle of this axis.

Further, an approximation equation for a SIN curve may be computed from each brightness characteristic curve, to compute from the approximation equation the angle at which the brightness level shows a minimum value (or maximum value), and the average molecular axis direction in the antiferroelectric state may be obtained from the thus computed angle.

If the minimum value of the brightness level can be found easily without computing the full length of the brightness characteristic curve, then the average molecular axis direction in the antiferroelectric state may be obtained from the angle that gives the minimum value.

For the reference axis of the liquid crystal panel, the scribe direction of the liquid crystal panel, the deposition direction of ITO, the direction of alignment of the liquid crystal, the arrangement direction of the black matrix, or the arrangement direction of the sealant can be used.

Next, a further alternative method of obtaining the intrinsic antiferroelectric axis direction of the antiferroelectric liquid crystal panel will be described in detail below. FIGS. 19 and 20 are flowcharts illustrating the further alternative procedure for obtaining the intrinsic antiferroelectric axis direction.

When the procedure is initiated (S1), the average molecular axis direction in the rightward-tilted antiferroelectric state is obtained first. The antiferroelectric liquid crystal is set into the leftward-tilted ferroelectric state by applying a negative voltage (S2), and then a voltage of about 0V is applied to provide a relaxation period to set the liquid crystal into the leftward-tilted antiferroelectric state (S3). Next, the liquid crystal is set into the rightward-tilted ferroelectric state by applying a positive voltage (S4), and then a voltage of about 0V is applied to provide a relaxation period to set the liquid crystal into the rightward-tilted antiferroelectric state (S5). Next, the antiferroelectric liquid crystal panel is placed on the rotating specimen table of a polarization microscope equipped with a CCD; the direction of alignment of the antiferroelectric liquid crystal is aligned with the direction of the polarization axis of the top polarizer mounted in the polarization microscope, and the polarization axis of the bottom polarizer is oriented at right angles to the polarization axis of the top polarizer (S6). Next, using a workstation equipped with a video capture board, an image captured by the CCD is converted into image data consisting of a matrix of horizontally and vertically arranged pixels of the antiferroelectric liquid crystal panel. Then, using image analysis software, the image data is analyzed to determine the brightness level of each pixel out of Y (256) levels ranging from dark to bright and compute the average brightness level of the specific pixel region (S7). The thus computed average brightness level is plotted to the brightness level along the vertical axis against the measurement angle of 0 degree on the horizontal axis (S8). Next, keeping the top and bottom polarizers of the polarization microscope intact, the liquid crystal panel in the rightward-tilted antiferroelectric state is rotated An degrees (n is a real number) about its center (S9). Then, in the same manner as the measurement made at the measurement angle of 0 degree, the average brightness level is computed at ±n degrees (S10). The thus computed average brightness level is plotted to the brightness level along the vertical axis against the measurement angle of ±n degrees on the horizontal axis of the graph (S11). Next, it is determined whether the brightness characteristic curve for the rightward-tilted antiferroelectric state is completed or not (S12), and if not completed yet, the processing in steps S9 to S12 is repeated by varying the value of n, to draw the brightness characteristic curve until the curve is completed. When the brightness characteristic curve is completed (YES at S12), then the axis about which the brightness characteristic curve for the rightward-tilted antiferroelectric state has mirror symmetry is obtained, and from the angle of this axis, the average molecular axis direction in the rightward-tilted antiferroelectric state is obtained (S13).

The average molecular axis direction in the leftward-tilted antiferroelectric state is obtained next. The antiferroelectric liquid crystal is set into the rightward-tilted ferroelectric state by applying a positive voltage (S14), and then a voltage of about 0V is applied to provide a relaxation period to set the liquid crystal into the rightward-tilted antiferroelectric state (S15). Next, the liquid crystal is set into the leftward-tilted ferroelectric state by applying a negative voltage (S16), and then a voltage of about 0V is applied to provide a relaxation period to set the liquid crystal into the leftward-tilted antiferroelectric state (S17). Next, the same processing as in steps S6 to S12 is performed to construct the brightness characteristic curve for the leftward-tilted antiferroelectric state (S18); then, the axis about which the brightness characteristic curve has mirror symmetry is obtained, and from the angle of this axis, the average molecular axis direction in the leftward-tilted antiferroelectric state is obtained (S19). Then, the intrinsic antiferroelectric axis is set between the thus obtained average molecular axis directions in the rightward-tilted and leftward-tilted antiferroelectric states (S20), and the process is terminated (S21).

In the above flow, the polarization axis direction has been set using the direction of alignment of the liquid crystal as the reference axis. However, instead of the direction of alignment, the scribe direction of the liquid crystal panel, the deposition direction of ITO, the arrangement direction of the black matrix, or the arrangement direction of the sealant may be taken as the reference axis.

In an alternative method of obtaining the average molecular axis direction in each antiferroelectric state, an approximation equation for a SIN curve is computed from the brightness characteristic curve for the rightward-tilted antiferroelectric state, the angle at which the brightness level shows the minimum value is computed from the approximation equation, and the average molecular axis direction in the rightward-tilted antiferroelectric state is obtained from the thus computed angle; similarly, an approximation equation for a SIN curve is computed from the brightness characteristic curve for the leftward-tilted antiferroelectric state, the angle at which the brightness level shows the minimum value is computed from the approximation equation, and the average molecular axis direction in the leftward-tilted antiferroelectric state is obtained from the thus computed angle. If the minimum value of the brightness level can be found easily without computing the full length of the brightness characteristic curve, then the angle that gives the minimum value may be taken to define the average molecular axis direction in the corresponding antiferroelectric state.

In the flowcharts shown in FIGS. 17, 18, 19, and 20, the average molecular axis direction in the rightward-tilted antiferroelectric state is obtained first, and then the average molecular axis direction in the leftward-tilted antiferroelectric state is obtained. However, the terms right and left here are used just to distinguish the direction of polarization. Therefore, the above order can be interchanged.

I claim:

1. An antiferroelectric liquid crystal display apparatus having at least two substrates each having at least electrodes and an alignment film formed thereon, said electrodes formed on said substrates being disposed so as to oppose across a gap therebetween, said alignment film being formed on each of opposing surfaces of said substrates, and said substrates sandwiching therebetween a liquid crystal sealed with a sealant around the periphery thereof, said antiferroelectric liquid crystal display apparatus further having at least one polarizer disposed on the surface of one of said substrates opposite the opposing surface thereof, wherein said antiferroelectric liquid crystal display apparatus includes an antiferroelectric liquid crystal panel in which a rightward-tilted antiferroelectric state and a leftward-tilted antiferroelectric state exist, and the direction of the polarization axis of said at least one polarizer is oriented along a direction between an average molecular axis direction in said rightward-tilted antiferroelectric state and an average molecular axis direction in said leftward-tilted antiferroelectric state of said liquid crystal panel.

2. An antiferroelectric liquid crystal display apparatus having at least two substrates each having at least electrodes and an alignment film formed thereon, said electrodes formed on said substrates being disposed so as to oppose across a gap therebetween, said alignment film being formed on each of opposing surfaces of said substrates, and said substrates sandwiching therebetween a liquid crystal sealed with a sealant around the periphery thereof, said antiferroelectric liquid crystal display apparatus further having a polarizer disposed on the surface of each of said substrates opposite the opposing surface thereof, wherein said antiferroelectric liquid crystal display apparatus includes an antiferroelectric liquid crystal panel in which a rightward-tilted antiferroelectric state and a leftward-tilted antiferroelectric state exist, and said polarizers are arranged in such a manner that the polarization axis of one of said polarizers is oriented along a direction between an average molecular axis direction in said rightward-tilted antiferroelectric state and an average molecular axis direction in said leftward-tilted antiferroelectric state of said liquid crystal panel, and that the polarization axis of the other of said polarizers is oriented at right angles to the polarization axis of said one polarizer.

3. An antiferroelectric liquid crystal display apparatus having at least two substrates each having at least electrodes and an alignment film formed thereon, said electrodes formed on said substrates being disposed so as to oppose across a gap therebetween, said alignment film being formed on each of opposing surfaces of said substrates, and said substrates sandwiching therebetween a liquid crystal sealed with a sealant around the periphery thereof, said antiferroelectric liquid crystal display apparatus further having at least one polarizer disposed on the surface of one of said substrates opposite the opposing surface thereof, wherein said antiferroelectric liquid crystal display apparatus includes an antiferroelectric liquid crystal panel in which a rightward-tilted antiferroelectric state and a leftward-tilted antiferroelectric state exist, and an intrinsic antiferroelectric axis direction is provided between an average molecular axis direction in said rightward-tilted antiferroelectric state and an average molecular axis direction in said leftward-tilted antiferroelectric state of said liquid crystal panel, said intrinsic antiferroelectric axis direction being aligned to be oriented in the same direction as the direction of the polarization axis of said at least one polarizer.

4. An antiferroelectric liquid crystal display apparatus according to claim 3, wherein said intrinsic antiferroelectric axis direction is set at midpoint between said average molecular axis direction in said rightward-tilted antiferroelectric state and said average molecular axis direction in said leftward-tilted antiferroelectric state.

5. An antiferroelectric liquid crystal display apparatus according to claim 4, wherein the angle between said intrinsic antiferroelectric axis direction and the direction of the polarization axis of said at least one polarizer, which is aligned with said intrinsic antiferroelectric axis direction, is within ±1 degree.

6. An antiferroelectric liquid crystal display apparatus having at least two substrates each having at least electrodes and an alignment film formed thereon, said electrodes formed on said substrates being disposed so as to oppose across a gap therebetween, said alignment film being formed on each of opposing surfaces of said substrates, and said substrates sandwiching therebetween a liquid crystal sealed with a sealant around the periphery thereof, said antiferroelectric liquid crystal display apparatus further having a polarizer disposed on the surface of each of said substrates opposite the opposing surface thereof, wherein said antiferroelectric liquid crystal display apparatus includes an antiferroelectric liquid crystal panel in which a rightward-tilted antiferroelectric state and a leftward-tilted antiferroelectric state exist, and an intrinsic antiferroelectric axis direction is provided between an average molecular axis direction in said rightward-tilted antiferroelectric state and an average molecular axis direction in said leftward-tilted antiferroelectric state of said liquid crystal panel, said polarizers being arranged in such a manner that the polarization axis of one of said polarizers is aligned to be oriented in the same direction as said intrinsic antiferroelectric axis direction, and that the polarization axis of the other of said polarizers is oriented at right angles to the polarization axis of said one polarizer.

7. An antiferroelectric liquid crystal display apparatus according to claim 6, wherein said intrinsic antiferroelectric axis direction is set at the midpoint between said average molecular axis direction in said rightward-tilted antiferroelectric state and said average molecular axis direction in said leftward-tilted antiferroelectric state.

8. An antiferroelectric liquid crystal display apparatus according to claim 7, wherein an angular error between said intrinsic antiferroelectric axis direction and the direction of the polarization axis of said one of polarizers, which is aligned with said intrinsic antiferroelectric axis direction, is within ±1 degree.

9. A method for fabricating an antiferroelectric liquid crystal display apparatus, wherein:

an antiferroelectric liquid crystal in a liquid crystal panel is set into a rightward-tilted antiferroelectric state, the angle of the polarization axis of a polarizer relative to a reference axis of said liquid crystal panel is varied, brightness levels at respective angles within a predetermined range are measured by measuring the brightness level at each angle, the angle at which said brightness level is maximum or minimum is detected, and an average molecular axis direction in said rightward-tilted antiferroelectric state is obtained from said detected angle; and said antiferroelectric liquid crystal in said liquid crystal panel is set into a leftward-tilted antiferroelectric state, the angle of the polarization axis of said polarizer relative to said reference axis of said liquid crystal panel is varied, brightness levels at respective angles within said predetermined range are measured by measuring the brightness level at each angle, the angle at which said brightness level is maximum or minimum is detected, and an average molecular axis direction in said leftward-tilted antiferroelectric state is obtained from said detected angle.

10. A method for fabricating an antiferroelectric liquid crystal display apparatus, wherein:

an antiferroelectric liquid crystal in a liquid crystal panel is set into a rightward-tilted antiferroelectric state, the angle of the polarization axis of a polarizer relative to a reference axis of said liquid crystal panel is varied, brightness levels at respective angles within a predetermined range are measured by measuring the brightness level at each angle, the angle at which said brightness level is maximum or minimum is detected, and an average molecular axis direction in said rightward-tilted antiferroelectric state is obtained from said detected angle;

said antiferroelectric liquid crystal in said liquid crystal panel is set into a leftward-tilted antiferroelectric state, the angle of the polarization axis of said polarizer relative to said reference axis of said liquid crystal panel is varied, brightness levels at respective angles within said predetermined range are measured by measuring the brightness level at each angle, the angle at which said brightness level is maximum or minimum is detected, and an average molecular axis direction in said leftward-tilted antiferroelectric state is obtained from said detected angle; and an intrinsic antiferroelectric axis direction is provided between said average molecular axis direction in said rightward-tilted antiferroelectric state and said average molecular axis direction in said leftward-tilted antiferroelectric state.

11. A method for fabricating an antiferroelectric liquid crystal display apparatus according to claim 10, wherein said intrinsic antiferroelectric axis direction is set at the midpoint between said average molecular axis direction in said rightward-tilted antiferroelectric state and said average molecular axis direction in said leftward-tilted antiferroelectric state.

12. A method for fabricating an antiferroelectric liquid crystal display apparatus according to claim 10 or 11, wherein either a scribe direction of said liquid crystal panel, an electrode arrangement direction, a liquid crystal alignment direction, a black matrix arrangement direction, or a sealant arrangement direction is taken to define said reference axis of said liquid crystal.

13. A method for fabricating an antiferroelectric liquid crystal display apparatus, wherein:

an antiferroelectric liquid crystal in a liquid crystal panel is set into a rightward-tilted antiferroelectric state, the angle of the polarization axis of a polarizer relative to a reference axis of said liquid crystal panel is varied, an average brightness level of a specific image region is computed at each angle, a brightness characteristic curve for said rightward-tilted antiferroelectric state is constructed by plotting said computed average brightness level to the brightness level along a vertical axis against the angle along a horizontal axis of a graph, and an average molecular axis direction in said rightward-tilted antiferroelectric state is obtained from an angle at which the brightness level on said brightness characteristic curve is maximum or minimum; and said antiferroelectric liquid crystal in said liquid crystal panel is set into a leftward-tilted antiferroelectric state, the angle of the polarization axis of said polarizer relative to said reference axis of said liquid crystal panel is varied, an average brightness level of said specific image region is computed at each angle, a brightness characteristic curve for said leftward-tilted antiferroelectric state is constructed by plotting said computed average brightness level to the brightness level along said vertical axis against the angle along said horizontal axis of said graph, and an average molecular axis direction in said leftward-tilted antiferroelectric state is obtained from an angle at which the brightness level on said brightness characteristic curve is maximum or minimum.

14. A method for fabricating an antiferroelectric liquid crystal display apparatus, wherein:

an antiferroelectric liquid crystal in a liquid crystal panel is set into a rightward-tilted antiferroelectric state, the angle of the polarization axis of a polarizer relative to a reference axis of said liquid crystal panel is varied, an average brightness level of a specific image region is computed at each angle, a brightness characteristic curve for said rightward-tilted antiferroelectric state is constructed by plotting said computed average brightness level to the brightness level along a vertical axis against the angle along a horizontal axis of a graph, and an average molecular axis direction in said rightward-tilted antiferroelectric state is obtained from an angle at which the brightness level on said brightness characteristic curve is maximum or minimum;

said antiferroelectric liquid crystal in said liquid crystal panel is set into a leftward-tilted antiferroelectric state, the angle of the polarization axis of said polarizer relative to said reference axis of said liquid crystal panel is varied, an average brightness level of said specific image region is computed at each angle, a brightness characteristic curve for said leftward-tilted antiferroelectric state is constructed by plotting said computed average brightness level to the brightness level along said vertical axis against the angle along said horizontal axis of said graph, and an average molecular axis direction in said leftward-tilted antiferroelectric state is obtained from an angle at which the brightness level on said brightness characteristic curve is maximum or minimum; and an intrinsic antiferroelectric axis direction is provided between said average molecular axis direction in said rightward-tilted antiferroelectric state and said average molecular axis direction in said leftward-tilted antiferroelectric state.

15. A method for fabricating an antiferroelectric liquid crystal display apparatus according to claim 14, wherein said average molecular axis direction in said rightward-tilted antiferroelectric state is obtained from an axis about which said brightness characteristic curve for said rightward-tilted antiferroelectric state has mirror symmetry, and said average molecular axis direction in said leftward-tilted antiferroelectric state is obtained from an axis about which said brightness characteristic curve for said leftward-tilted antiferroelectric state has mirror symmetry.

16. A method for fabricating an antiferroelectric liquid crystal display apparatus according to claim 14, wherein:

an approximation equation for a SIN curve is computed from said brightness characteristic curve obtained for said rightward-tilted antiferroelectric state, an angle at which the brightness level shows a maximum value or minimum value is computed from said approximation equation, and said average molecular axis direction in said rightward-tilted antiferroelectric state is obtained from said computed angle; and an approximation equation for a SIN curve is computed from said brightness characteristic curve obtained for said leftward-tilted antiferroelectric state, an angle at which the brightness level shows a maximum value or minimum value is computed from said approximation equation, and said average molecular axis direction in said leftward-tilted antiferroelectric state is obtained from said computed angle.

17. A method for fabricating an antiferroelectric liquid crystal display apparatus according to any one of claims 14 to 16, wherein said intrinsic antiferroelectric axis direction is set at midpoint between said average molecular axis direction in said rightward-tilted antiferroelectric state and said average molecular axis direction in said leftward-tilted antiferroelectric state.

18. A method for fabricating an antiferroelectric liquid crystal display apparatus according to any one of claims 14 to 16, wherein either a scribe direction of said liquid crystal panel, an electrode arrangement direction, a liquid crystal alignment direction, a black matrix arrangement direction, or a sealant arrangement direction is taken to define said reference axis of said liquid crystal.

19. A method for fabricating an antiferroelectric liquid crystal display apparatus, wherein:

an antiferroelectric liquid crystal in a liquid crystal panel is first set into a leftward-tilted ferroelectric state by applying a voltage of a negative voltage value, said liquid crystal is then set into a leftward-tilted antiferroelectric state by applying a voltage of about OV as a relaxation period, said liquid crystal is next set into a rightward-tilted ferroelectric state by applying a voltage of a positive voltage value, said liquid crystal is then set into a rightward-tilted antiferroelectric state by applying a voltage of about OV as a relaxation period, next the direction of alignment of said liquid crystal panel is oriented so as to coincide with the direction of the polarization axis of one polarizer while orienting the polarization axis of the other polarizer at right angles to the polarization axis of said one polarizer, an image captured by a CCD is converted into liquid crystal image data to compute an average brightness level of an specific image region, said computed average brightness level is marked on a vertical axis against a measurement angle of 0 degree plotted along a horizontal axis of a graph, keeping said polarizers intact said liquid crystal display apparatus in said rightward-tilted antiferroelectric state is rotated ±n degrees (n is a real number) about the center thereof, an average brightness level is computed at each angle in the same manner as when measured at said measurement angle of 0 degree, said computed average brightness level is marked on the vertical axis against the measurement angle of ±n degrees plotted along the horizontal axis of said graph thereby drawing a brightness characteristic curve for said rightward-tilted antiferroelectric state, and an average molecular axis direction in said rightward-tilted antiferroelectric state is obtained from an axis about which said brightness characteristic curve has mirror symmetry; and said antiferroelectric liquid crystal in said liquid crystal panel is first set into a rightward-tilted ferroelectric state by applying a voltage of a positive voltage value, said liquid crystal is then set into a rightward-tilted antiferroelectric state by applying a voltage of about OV as a relaxation period, said liquid crystal is next set into a leftward-tilted ferroelectric state by applying a voltage of a negative voltage value, said liquid crystal is then set into a leftward-tilted antiferroelectric state by applying a voltage of about OV as a relaxation period, next the direction of alignment of said liquid crystal panel is oriented so as to coincide with the direction of the polarization axis of one polarizer while orienting the polarization axis of the other polarizer at right angles to the polarization axis of said one polarizer, an image captured by said CCD is converted into liquid crystal image data to compute an average brightness level of said specific image region, said computed average brightness level is marked on said vertical axis against the measurement angle of 0 degree plotted along the horizontal axis of said graph, keeping said polarizers intact said liquid crystal display apparatus in said leftward-tilted antiferroelectric state is rotated ±n degrees (n is a real number) about the center thereof, an average brightness level is computed at each angle in the same manner as when measured at said measurement angle of 0 degree, said computed average brightness level is marked on the vertical axis against the measurement angle of ±n degrees plotted along the horizontal axis of said graph thereby drawing a brightness characteristic curve for said leftward-tilted antiferroelectric state, and an average molecular axis direction in said leftward-tilted antiferroelectric state is obtained from an axis about which said brightness characteristic curve has mirror symmetry.

20. A method for fabricating an antiferroelectric liquid crystal display apparatus, wherein:

an antiferroelectric liquid crystal in a liquid crystal panel is first set into a leftward-tilted ferroelectric state by applying a voltage of a negative voltage value, said liquid crystal is then set into a leftward-tilted antiferroelectric state by applying a voltage of about OV as a relaxation period, said liquid crystal is next set into a rightward-tilted ferroelectric state by applying a voltage of a positive voltage value, said liquid crystal is then set into a rightward-tilted antiferroelectric state by applying a voltage of about OV as a relaxation period, next the direction of alignment of said liquid crystal panel is oriented so as to coincide with the direction of the polarization axis of one polarizer while orienting the polarization axis of the other polarizer at right angles to the polarization axis of said one polarizer, an image captured by a CCD is converted into liquid crystal image data to compute an average brightness level of an attention image region, said computed average brightness level is marked on a vertical axis against a measurement angle of 0 degree plotted along a horizontal axis of a graph, keeping said polarizers intact said liquid crystal display apparatus in said rightward-tilted antiferroelectric state is rotated ±n degrees (n is a real number) about the center thereof, an average brightness level is computed at each angle in the same manner as when measured at said measurement angle of 0 degree, said computed average brightness level is marked on the vertical axis against the measurement angle of ±n degrees plotted along the horizontal axis of said graph thereby drawing a brightness characteristic curve for said rightward-tilted antiferroelectric state, and an average molecular axis direction in said rightward-tilted antiferroelectric state is obtained from an axis about which said brightness characteristic curve has mirror symmetry;

said antiferroelectric liquid crystal in said liquid crystal panel is first set into a rightward-tilted ferroelectric state by applying a voltage of a positive voltage value, said liquid crystal is then set into a rightward-tilted antiferroelectric state by applying a voltage of about 0V as a relaxation period, said liquid crystal is next set into a leftward-tilted ferroelectric state by applying a voltage of a negative voltage value, said liquid crystal is then set into a leftward-tilted antiferroelectric state by applying a voltage of about 0V as a relaxation period, next the direction of alignment of said liquid crystal panel is oriented so as to coincide with the direction of the polarization axis of one polarizer while orienting the polarization axis of the other polarizer at right angles to the polarization axis of said one polarizer, an image captured by said CCD is converted into liquid crystal image data to compute an average brightness level of said attention image region, said computed average brightness level is marked on said vertical axis against the measurement angle of 0 degree plotted along the horizontal axis of said graph, keeping said polarizers intact said liquid crystal display apparatus in said leftward-tilted antiferroelectric state is rotated in degrees (n is a real number) about the center thereof, an average brightness level is computed at each angle in the same manner as when measured at said measurement angle of 0 degree, said computed average brightness level is marked on the vertical axis against the measurement angle of ±n degrees plotted along the horizontal axis of said graph thereby drawing a brightness characteristic curve for said leftward-tilted antiferroelectric state, and an average molecular axis direction in said leftward-tilted antiferroelectric state is obtained from an axis about which said brightness characteristic curve has mirror symmetry; and an intrinsic antiferroelectric axis direction is provided between said average molecular axis direction in said rightward-tilted antiferroelectric state and said average molecular axis direction in said leftward-tilted antiferroelectric state.

21. A method for fabricating an antiferroelectric liquid crystal display apparatus according to claim 20, wherein said average molecular axis direction in said rightward-tilted antiferroelectric state and said average molecular axis direction in said leftward-tilted antiferroelectric state are each obtained from an angle at which the brightness level is maximum or minimum.

22. A method for fabricating an antiferroelectric liquid crystal display apparatus according to claim 20, wherein:

an approximation equation for a SIN curve is computed from said brightness characteristic curve obtained for said rightward-tilted antiferroelectric state, an angle at which the brightness level shows a maximum value or minimum value is computed from said approximation equation, and said average molecular axis direction in said rightward-tilted antiferroelectric state is obtained from said computed angle; and an approximation equation for a SIN curve is computed from said brightness characteristic curve obtained for said leftward-tilted antiferroelectric state, an angle at which the brightness level shows a maximum value or minimum value is computed from said approximation equation, and said average molecular axis direction in said leftward-tilted antiferroelectric state is obtained from said computed angle.

23. A method for fabricating an antiferroelectric liquid crystal display apparatus according to any one of claims 20 to 22, wherein said intrinsic antiferroelectric axis direction is set at midpoint between said average molecular axis direction in said rightward-tilted antiferroelectric state and said average molecular axis direction in said leftward-tilted antiferroelectric state.

24. A method for fabricating an antiferroelectric liquid crystal display apparatus according to any one of claims 20 to 22, wherein instead of the direction of liquid crystal alignment of said antiferroelectric liquid crystal display apparatus, either a scribe direction of said liquid crystal panel, an electrode arrangement direction, a black matrix arrangement direction, or a sealant arrangement direction is taken as a reference axis of said liquid crystal.

* * * * *

UNITED STATES PATENT AND TRADEMARK OFFICE
CERTIFICATE OF CORRECTION

PATENT NO. : 5,995,181
DATED : November 30, 1999
INVENTOR : Satoshi IMOTO

It is certified that error appears in the above-identified patent and that said Letters Patent is hereby corrected as shown below:

Claim 20, col. 23, line 48, "in degrees" should read -- $\pm$n degrees--.

Signed and Sealed this

Sixth Day of February, 2001

Attest:

Q. TODD DICKINSON

*Attesting Officer*  *Director of Patents and Trademarks*